(12) United States Patent
Meincke et al.

(10) Patent No.: US 11,933,034 B2
(45) Date of Patent: Mar. 19, 2024

(54) DRAINAGE SYSTEM, DRAINAGE UNITS, AND METHODS

(71) Applicant: ACO SEVERIN AHLMANN GMBH & CO. KOMMANDITGESELLSCHAFT, Büdelsdorf (DE)

(72) Inventors: Arne Meincke, Osdorf (DE); Marco Wandkowski, Kronshagen (DE); Sascha Müller-Baku, Rendsburg (DE)

(73) Assignee: ACO AHLMANN SE & CO. KG, Budelsdorf (DE)

( * ) Notice: Subject to any disclaimer, the term of this patent is extended or adjusted under 35 U.S.C. 154(b) by 325 days.

(21) Appl. No.: 17/431,663

(22) PCT Filed: May 23, 2019

(86) PCT No.: PCT/EP2019/063402
§ 371 (c)(1),
(2) Date: Aug. 17, 2021

(87) PCT Pub. No.: WO2020/169215
PCT Pub. Date: Aug. 27, 2020

(65) Prior Publication Data
US 2022/0120073 A1    Apr. 21, 2022

(51) Int. Cl.
*E03F 3/04* (2006.01)
*E01C 11/22* (2006.01)
(Continued)

(52) U.S. Cl.
CPC .............. *E03F 3/04* (2013.01); *E01C 11/227* (2013.01); *E03F 3/046* (2013.01); *E03F 3/06* (2013.01);
(Continued)

(58) Field of Classification Search
CPC ..... E03F 3/04; E03F 3/046; E03F 3/06; E03F 5/04; E03F 5/0401; E01C 11/227
(Continued)

(56) References Cited

U.S. PATENT DOCUMENTS 4,365,911 A    12/1982 Rossberg
4,490,067 A *  12/1984 Dahowski ............. E01C 11/227
52/169.5
(Continued)

FOREIGN PATENT DOCUMENTS

CN    108331130 A     7/2018
DE    202005004634 U1  6/2005
(Continued)

*Primary Examiner* — Frederick L Lagman
(74) *Attorney, Agent, or Firm* — Pearne & Gordon LLP

(57) ABSTRACT

Disclosed is a drainage system (1) comprising: at least one water receiving unit (20) having: a water receptacle (22) for receiving water from an adjoining surface of an upper stratum; and at least one drainage unit comprising: a body; wherein: the water receptacle (22) can be integrated into the upper stratum; the drainage unit can be provided and oriented, at least in part, in a central stratum at a distance under the surface, with respect to its uppermost face, such that water flowing out of the water receiving unit (20) can flow into the drainage unit through a connection between the water receptacle (22) and the body; and the connection can be maintained irrespective of a change in this distance. Also disclosed are drainage units and methods.

17 Claims, 17 Drawing Sheets

(51) Int. Cl.
*E03F 1/00* (2006.01)
*E03F 3/06* (2006.01)
*E03F 5/04* (2006.01)
*F16L 9/22* (2006.01)
*E01B 1/00* (2006.01)
*E03F 5/06* (2006.01)

(52) U.S. Cl.
CPC ............. *E03F 5/04* (2013.01); *F16L 9/22* (2013.01); *E01B 1/008* (2013.01); *E03F 2005/0413* (2013.01); *E03F 5/06* (2013.01)

(58) Field of Classification Search
USPC .......................................... 405/119; 404/2, 4
See application file for complete search history.

(56) References Cited

U.S. PATENT DOCUMENTS

| | | | | |
|---|---|---|---|---|
| 4,640,643 | A * | 2/1987 | Williams | E01C 11/227 |
| | | | | 405/118 |
| 5,380,121 | A * | 1/1995 | Schluter | E01C 11/227 |
| | | | | 210/164 |
| 5,529,436 | A * | 6/1996 | Meyers | E03F 3/046 |
| | | | | 405/118 |
| 5,564,857 | A * | 10/1996 | Schluter | E02B 11/005 |
| | | | | 405/36 |
| 5,908,266 | A * | 6/1999 | Miller | E01C 11/227 |
| | | | | 405/36 |
| 6,079,903 | A * | 6/2000 | Wagner | E03F 1/002 |
| | | | | 405/36 |
| 6,234,711 | B1 * | 5/2001 | Beaman | E01C 11/223 |
| | | | | 249/8 |
| 6,905,285 | B2 * | 6/2005 | Little | E03F 3/046 |
| | | | | 405/36 |
| 7,008,137 | B2 * | 3/2006 | Muller | E01C 11/225 |
| | | | | 405/38 |
| 7,134,808 | B2 * | 11/2006 | Albone | E01C 11/227 |
| | | | | 405/36 |
| 7,264,418 | B1 | 9/2007 | Houck | |
| 9,739,044 | B1 | 8/2017 | Files, Jr. | |
| 2011/0204529 | A1 | 8/2011 | Kerkhoff | |
| 2012/0288330 | A1 * | 11/2012 | Altinier | E01C 11/227 |
| | | | | 405/43 |

FOREIGN PATENT DOCUMENTS

| | | |
|---|---|---|
| EP | 1380691 A2 | 1/2004 |
| EP | 1860244 A1 | 11/2007 |
| EP | 1870519 A2 | 12/2007 |
| EP | 2520728 A1 | 11/2012 |
| EP | 2522773 A2 | 11/2012 |
| EP | 2728076 A2 | 5/2014 |
| EP | 2899324 A1 | 7/2015 |
| EP | 2957809 A1 | 12/2015 |
| EP | 3075908 A1 | 10/2016 |
| GB | 2311549 A | 10/1997 |
| GB | 2469481 A | 10/2010 |
| KR | 20120020900 A | 3/2012 |

* cited by examiner

DRAINAGE SYSTEM, DRAINAGE UNITS, AND METHODS

The invention relates to drainage and particularly to a drainage system, units of the drainage system, and a drainage method.

Drainage systems are known from the prior art.

EP 1 380 691 A2 discloses a wide drainage channel comprising one-piece plastic drainage channel sections. Each section includes a pipe section and hollow projections that support a channel that has a slot that is open to a surface to be drained. The size and spacing of the projections are such that loose reinforcing rods may be disposed in curved openings disposed between the projections. The channel may be recessed to allow a reinforcing mesh to be slid through the slotted channel into the openings.

EP 1 518 964 A1 discloses an inlet forming device comprising an elongated slot which in use lies in a surface to be drained, and a channel through which, in use, liquid can drain from the surface through the inlet forming device. The inlet forming device further comprises one or more transverse openings through which a material in which the inlet forming device is embedded in use, can extend from one or both sides of the inlet forming device to form a structural bridging element.

The problem to be addressed by this invention is to provide an improved drainage system, particularly one of the above-mentioned drainage systems, improved drainage units and an improved drainage method.

This problem is solved by the subject matter of the independent claims.

Advantageous embodiments are disclosed in the dependent claims.

The invention also relates to a drainage system, comprising:
- at least one water receiving unit, comprising:
  - a water receptacle for receiving water from an adjoining surface of an upper stratum; and
- at least one drainage unit, comprising:
  - a body;
- wherein:
  - the water receptacle can be integrated into the upper stratum;
  - the drainage unit can be provided and oriented, at least in part, in a central stratum at a distance under the surface, with respect to its uppermost face, such that water flowing out of the water receiving unit can flow into the drainage unit through a connection between the water receptacle and the body; and
  - the connection can be maintained irrespective of a change in this distance.

Preferably, the invention relates to a drainage system wherein the spacing is selected or dimensioned such that a load or nominal load or maximum load is distributed or conically distributed at the surface in the upper stratum and/or the middle stratum, such that its effect on the body can be neglected.

Preferably, the invention relates to a drainage system wherein the water receptacle is configured as a point drainage system.

Preferably, the invention relates to a drainage system wherein the water receptacle is configured as a linear drainage system.

Preferably, the invention relates to a drainage system wherein the water receptacle and/or the surface comprise connecting means and/or latching means, such that they can be connected and/or latched together.

Preferably, the invention relates to a drainage system wherein the water receptacle comprises metal, concrete, polymer concrete or plastic, or a combination thereof.

Preferably, the invention relates to a drainage system wherein the drainage unit is designed as a water discharge unit for discharging the water.

Preferably, the invention relates to a drainage system wherein the drainage unit is configured as a water storage unit, an infiltration ditch, or a cistern for storing or temporarily storing the water.

Preferably, the invention relates to a drainage system wherein the body is configured as a tubular body.

Preferably, the invention relates to a drainage system wherein the body is configured as a channel body.

Preferably, the invention relates to a drainage system wherein the body is configured as an infiltration ditch body or infiltration ditch filler body.

Preferably, the invention relates to a drainage system wherein the body is configured as a polyhedron, prism, cuboid, cube, spade or parallelepiped, pyramid, convex body, body of revolution, ellipsoid of revolution, barrel, sphere, hemisphere, dome, cone, truncated cone, cylinder, circular cylinder, disc, column, cylindrical section, or torus.

Preferably, the invention relates to a drainage system wherein the body comprises a plurality of body members.

Preferably, the invention relates to a drainage system wherein the body members are substantially identical in shape.

Preferably, the invention relates to a drainage system wherein the spacing is selected or dimensioned taking into account a component or main component of the upper stratum.

Preferably, the invention relates to a drainage system wherein the upper stratum comprises asphalt and/or concrete.

Preferably, the invention relates to a drainage system wherein the spacing is selected or dimensioned with respect a component or main component of the middle stratum and/or its angle of friction and/or angle of repose.

Preferably, the invention relates to a drainage system wherein the angle of repose is 25° to 45°, 280 to 40°, 30° to 350, or 34°.

Preferably, the invention relates to a drainage system wherein the middle stratum comprises rock, stones, sand, crushed sand, round stones, gravel, rubble, crushed stones, railroad ballast, chippings, and/or crushed rocks.

Preferably, the invention relates to a drainage system wherein the distance is selected or dimensioned with respect to a diameter, outer diameter and/or nominal diameter of the body.

Preferably, the invention relates to a drainage system wherein the outer diameter is 200 mm to 1000 mm, 250 mm to 900 mm, 315 mm to 800 mm, 400 mm to 630 mm, or 500 mm.

Preferably, the invention relates to a drainage system wherein the nominal diameter is DN 200 mm to DN 1000 mm, DN 250 mm to DN 900 mm, DN 300 mm to DN 800 mm, DN 400 mm to DN 600 mm, or DN 500 mm.

Preferably, the invention relates to a drainage system wherein the distance at the outer diameter of 200 mm is 0.43 m to 0.63 m or 0.51 m.

Preferably, the invention relates to a drainage system wherein the distance at the outer diameter of 225 mm is 0.45 m to 0.65 m or 0.53 m.

Preferably, the invention relates to a drainage system wherein the distance at the outer diameter of 250 mm is 0.47 m to 0.68 m or 0.56 m.

Preferably, the invention relates to a drainage system wherein the distance at the outer diameter of 280 mm is 0.50 m to 0.70 m or 0.58 m.

Preferably, the invention relates to a drainage system wherein the distance at the outer diameter of 315 mm is 0.53 m to 0.73 m or 0.61 m.

Preferably, the invention relates to a drainage system wherein the distance at the outer diameter of 355 mm is 0.56 m to 0.77 m or 0.65 m.

Preferably, the invention relates to a drainage system wherein the distance at the outer diameter of 400 mm is 0.60 m to 0.81 m or 0.69 m.

Preferably, the invention relates to a drainage system wherein the distance at the outer diameter of 450 mm is 0.64 m to 0.85 m or 0.73 m.

Preferably, the invention relates to a drainage system wherein the distance at the outer diameter of 500 mm is 0.69 m to 0.89 m or 0.77 m.

Preferably, the invention relates to a drainage system wherein the distance at the outer diameter of 560 mm is 0.74 m to 0.94 m or 0.82 m.

Preferably, the invention relates to a drainage system wherein the distance at the outer diameter of 630 mm is 0.80 m to 1.00 m or 0.88 m.

Preferably, the invention relates to a drainage system wherein the distance at the outer diameter of 710 mm is 0.87 m to 1.07 m or 0.95 m.

Preferably, the invention relates to a drainage system wherein the distance at the outer diameter of 800 mm is 0.95 m to 1.15 m or 1.03 m.

Preferably, the invention relates to a drainage system wherein the distance at the outer diameter of 900 mm is 1.03 m to 1.24 m or 1.12 m.

Preferably, the invention relates to a drainage system wherein the distance at the outer diameter of 1000 mm is 1.12 m to 1.32 m or 1.21 m.

Preferably, the invention relates to a drainage system, wherein the body is selected and/or dimensioned with respect to the distance.

Preferably, the invention relates to a drainage system wherein the body comprises metal, concrete, polymer concrete or plastic, or a combination thereof.

The invention also relates to a water receiving unit for use in one of the drainage systems described above.

The invention also relates to a drainage unit for use in any one of the drainage systems described above.

The invention also relates to a water discharge unit for use in any one of the drainage systems described above.

The invention also relates to a water storage unit for use in any one of the drainage systems described above.

Preferably, the invention relates to a water storage unit wherein the water storage unit is configured as an infiltration ditch or cistern.

The invention also relates to a drainage method, comprising:
Providing at least one water receiving unit, comprising:
a water receptacle for receiving water from an adjoining surface of an upper stratum; and
Providing at least one drainage unit, comprising:
a body;
Integrating the water receptacle into the upper stratum; and
Arranging and aligning the drainage unit at a distance, relative to its upper side, or top edge, below the surface at least partially in a middle stratum, such that the water flowing out of the water receiving unit can flow into the drainage unit through a connection of the water receptacle and the body;
wherein:
the connection can be maintained irrespective of a change in this distance.

Preferably, the invention relates to a drainage method wherein the distance is selected or dimensioned such that a load or nominal load or maximum load is distributed or conically distributed at the surface in the upper stratum and/or the middle stratum, such that its effect on the body can be neglected.

Preferably, the invention relates to a drainage method wherein the water receptacle is configured as a point drainage system.

Preferably, the invention relates to a drainage method wherein the water receptacle is configured as a linear drainage system.

Preferably, the invention relates to a drainage method wherein the water receptacle and/or surface comprises connecting means and/or latching means such that they can be connected and/or latched together.

Preferably, the invention relates to a drainage method wherein the water receptacle comprises metal, concrete, polymer concrete or plastic, or a combination thereof.

Preferably, the invention relates to a drainage method wherein the drainage unit is configured as a water discharge unit for discharging the water.

Preferably, the invention relates to a drainage method wherein the drainage unit is configured as a water storage unit, an infiltration ditch, or a cistern for storing or temporarily storing the water.

Preferably, the invention relates to a drainage method wherein the body is configured as a tubular body.

Preferably, the invention relates to a drainage method wherein the body is configured as a channel body.

Preferably, the invention relates to a drainage method wherein the body is configured as an infiltration ditch body or infiltration ditch filler body.

Preferably, the invention relates to a drainage method wherein the body is configured as a polyhedron, prism, cuboid, cube, spate or parallelepiped, pyramid, convex body, solid of revolution, ellipsoid of revolution, barrel, sphere, hemisphere, dome, cone, truncated cone, cylinder, circular cylinder, disc, column, cylindrical section, or torus.

Preferably, the invention relates to a drainage method wherein the body comprises a plurality of body members.

Preferably, the invention relates to a drainage method wherein the body members are configured substantially identically.

Preferably, the invention relates to a drainage method wherein the spacing is selected or dimensioned with respect to a component or main component of the upper stratum.

Preferably, the invention relates to a drainage method wherein the upper stratum comprises asphalt and/or concrete.

Preferably, the invention relates to a drainage method wherein the spacing is selected or dimensioned with respect to a component or main component of the middle stratum and/or its angle of friction and/or angle of repose.

Preferably, the invention relates to a drainage method wherein the angle of repose is 25° to 45°, 28° to 40°, 30° to 350, or 34°.

Preferably, the invention relates to a drainage method wherein the middle stratum comprises rock, stones, sand, crushed sand, round stones, gravel, rubble, crushed stones, railroad ballast, chippings, and/or crushed rocks.

Preferably, the invention relates to a drainage method wherein the distance is selected or dimensioned with respect to a diameter, outer diameter and/or nominal diameter of the body.

Preferably, the invention relates to a drainage method wherein the outer diameter is 200 mm to 1000 mm, 250 mm to 900 mm, 315 mm to 800 mm, 400 mm to 630 mm, or 500 mm.

Preferably, the invention relates to a drainage method wherein the nominal diameter is DN 200 mm to DN 1000 mm, DN 250 mm to DN 900 mm, DN 300 mm to DN 800 mm, DN 400 mm to DN 600 mm, or DN 500 mm.

Preferably, the invention relates to a drainage method wherein the distance at the outer diameter of 200 mm is 0.43 m to 0.63 m or 0.51 m.

Preferably, the invention relates to a drainage method wherein the distance at the outer diameter of 225 mm is 0.45 m to 0.65 m or 0.53 m.

Preferably, the invention relates to a drainage method wherein the distance at the outer diameter of 250 mm is 0.47 m to 0.68 m or 0.56 m.

Preferably, the invention relates to a drainage method wherein the distance at the outer diameter of 280 mm is 0.50 m to 0.70 m or 0.58 m.

Preferably, the invention relates to a drainage method wherein the distance at the outer diameter of 315 mm is 0.53 m to 0.73 m or 0.61 m.

Preferably, the invention relates to a drainage method wherein the distance at the outer diameter of 355 mm is 0.56 m to 0.77 m or 0.65 m.

Preferably, the invention relates to a drainage method wherein the distance at the outer diameter of 400 mm is 0.60 m to 0.81 m or 0.69 m.

Preferably, the invention relates to a drainage method wherein the distance at the outer diameter of 450 mm is 0.64 m to 0.85 m or 0.73 m.

Preferably, the invention relates to a drainage method wherein the distance at the outer diameter of 500 mm is 0.69 m to 0.89 m or 0.77 m.

Preferably, the invention relates to a drainage method wherein the distance at the outer diameter of 560 mm is 0.74 m to 0.94 m or 0.82 m.

Preferably, the invention relates to a drainage method wherein the distance at the outer diameter of 630 mm is 0.80 m to 1.00 m or 0.88 m.

Preferably, the invention relates to a drainage method wherein the distance at the outer diameter of 710 mm is 0.87 m to 1.07 m or 0.95 m.

Preferably, the invention relates to a drainage method wherein the distance at the outer diameter of 800 mm is 0.95 m to 1.15 m or 1.03 m.

Preferably, the invention relates to a drainage method wherein the distance at the outer diameter of 900 mm is 1.03 m to 1.24 m or 1.12 m.

Preferably, the invention relates to a drainage method wherein the distance at the outer diameter of 1000 mm is 1.12 m to 1.32 m or 1.21 m.

Preferably, the invention relates to a drainage method wherein the body is selected and/or dimensioned with respect to the distance.

Preferably, the invention relates to a drainage method wherein the body comprises metal, concrete, polymer concrete or plastic, or a combination thereof.

The invention also relates to a drainage system, comprising:
- at least one water receiving unit, comprising:
  - a water receptacle for receiving water from an adjoining surface; and
  - a first neck piece connected to the water receptacle and positionable to allow water to flow out of the water receiving unit through an opening of the first neck piece; and
- at least one water discharge unit for discharging the water, comprising:
  - a tubular body; and
  - a first opening which is arranged on the tubular body for receiving the water into the tubular body:
- wherein:
  - the water discharge unit can be arranged and aligned below the surface in such a way that the opening of the first neck piece and the first opening of the tubular body can be connected and the water flowing out of the water receiving unit can flow into the water discharge unit.

Preferably, the invention relates to a drainage system wherein the water receptacle is configured as a point drainage system.

Preferably, the invention relates to a drainage system wherein the water receptacle is configured as a linear drainage system.

Preferably, the invention relates to a drainage system wherein the water receptacle has a first end and a second end arranged face-to-face and comprising connecting means and/or latching means, such that the first end of the water receptacle and the second end of another water receptacle can be connected and/or latched together.

Preferably, the invention relates to a drainage system wherein the first end and the second end of the water receptacle are identical or complementary to each other.

Preferably, the invention relates to a drainage system wherein the water receptacle and/or the surface comprise connecting means and/or latching means, such that they can be connected and/or latched together.

Preferably, the invention relates to a drainage system wherein the water receptacle and the first neck piece are configured integrally.

Preferably, the invention relates to a drainage system wherein the water receptacle and/or the first neck comprises metal, concrete, polymer concrete or plastic, or a combination thereof.

Preferably, the invention relates to a drainage system wherein the water receiving unit comprises at least one second neck piece or more connected to the water receptacle and arrangeable such that the water can flow out of the water receiving unit through an opening of the second neck piece.

Preferably, the invention relates to a drainage system wherein the water discharge unit comprises a second opening arranged along the tubular body with the first opening, for receiving the water into the tubular body.

Preferably, the invention relates to a drainage system wherein the tubular body is dimensioned for loading at the surface, taking into account its distance from the surface and/or its condition.

Preferably, the invention relates to a drainage system wherein the tubular body has a first end and a second end arranged face-to-face and comprising connecting means and/or latching means, such that the first end of the water receptacle and the second end of another water receptacle can be connected and/or latched together.

Preferably, the invention relates to a drainage system wherein the first end and the second end of the tubular body are identical or complementary to each other.

Preferably, the invention relates to a drainage system wherein the first end of the tubular body is configured as a socket end and the second end of the tubular body is configured as a tip end.

Preferably, the invention relates to a drainage system wherein the socket end comprises latching elements, insertion elements, or insertion elements with a startup bevel, which are arranged along a circumference of the tubular body, and the tip end comprises latching regions arranged along the circumference of the tubular body.

Preferably, the invention relates to a drainage system wherein the tubular body comprises metal, concrete, polymer concrete or plastic, or a combination thereof.

Preferably, the invention relates to a drainage system wherein the tubular body has a round, oval, triangular, square, pentagonal, hexagonal, rectangular, or square cross-section.

Preferably, the invention relates to a drainage system wherein the tubular body is formed by a channel member and a cover member which comprises the first opening of the tubular body.

Preferably, the invention relates to a drainage system wherein the tubular body is formed by a first half-shell body and a second half-shell body which comprises the first opening of the tubular body.

Preferably, the invention relates to a drainage system wherein the first half-shell body and the second half-shell body are configured substantially identically.

Preferably, the invention relates to a drainage system wherein at least one region for producing the first opening is provided on the first half-shell body or the second half-shell body, or in which the first opening is already produced.

Preferably, the invention relates to a drainage system wherein edge regions of the first half-shell body or the second half-shell body are formed in such a way that they can be stacked inside one another and/or on top of one another.

Preferably, the invention relates to a drainage system wherein the edge regions of the first half-shell body or the second half-shell body comprise inwardly projecting beads, tapering beads, converging beads, and/or conical beads.

Preferably, the invention relates to a drainage system wherein the first half-shell body and/or the second half-shell body comprise connecting means and/or latching means, such that they can be connected and/or latched together.

Preferably, the invention relates to a drainage system, further comprising at least one cover unit for covering the water receiving unit.

Preferably, the invention relates to a drainage system wherein the cover unit has a first end and a second end arranged face-to-face and comprising connecting means and/or latching means, such that the first end of the cover unit and the second end of a further cover unit can be connected and/or latched together.

Preferably, the invention relates to a drainage system wherein the first end and the second end of the cover unit are identical or complementary to each other.

Preferably, the invention relates to a drainage system wherein the cover unit comprises at least one opening for letting the water through.

Preferably, the invention relates to a drainage system wherein the cover unit comprises at least one rib for guiding the water and/or for stabilizing the water receptacle.

Preferably, the invention relates to a drainage system wherein the cover unit comprises metal, concrete, polymer concrete or plastic, or a combination thereof.

Preferably, the invention relates to a drainage system wherein the cover unit and/or the water receiving unit comprise connecting means and/or latching means, such that they can be connected and/or latched together.

Preferably, the invention relates to a drainage system wherein the water receiving unit comprises a latching member and the cover unit comprises a latching region.

Preferably, the invention relates to a drainage system, further comprising at least one water feeding unit for feeding the water from the water receiving unit into the water discharge unit.

Preferably, the invention relates to a drainage system wherein the water feeding unit can be arranged and aligned between the water receiving unit and the water discharge unit, such that the opening of the first neck piece can be connected to a first opening of the water feeding unit and the first opening of the tubular body can be connected to a second opening of the water feeding unit, and water flowing from the water receiving unit can flow through the water feeding unit into the water discharge unit.

Preferably, the invention relates to a drainage system, wherein the water feeding unit is of adjustable height, telescoping, or folded in concertina fashion.

Preferably, the invention relates to a drainage system wherein the water feeding unit comprises metal, concrete, polymer concrete or plastic, or a combination thereof.

Preferably, the invention relates to a drainage system, further comprising at least one supporting unit for supporting the water discharge unit.

Preferably, the invention relates to a drainage system wherein the supporting unit and/or the water discharge unit comprise connecting means and/or latching means, such that they can be connected and/or latched together.

Preferably, the invention relates to a drainage system wherein the supporting unit is configured such that it can be stacked with other supporting units.

Preferably, the invention relates to a drainage system wherein the supporting unit is configured in one piece.

Preferably, the invention relates to a drainage system wherein the supporting unit is configured in multiple parts.

Preferably, the invention relates to a drainage system wherein the supporting unit comprises a first bearing element and a second bearing element for receiving the water discharge unit.

Preferably, the invention relates to a drainage system wherein the first bearing element and/or the second bearing element comprise connecting means and/or latching means, such that they can be connected and/or latched together.

Preferably, the invention relates to a drainage system wherein the first bearing element is configured as a first side element and the second bearing element is configured as a second side element.

Preferably, the invention relates to a drainage system wherein the first bearing element and the second bearing element are manufactured in one piece and/or can be separated from each other.

Preferably, the invention relates to a drainage system wherein the first bearing element and the second bearing element are identical or complementary or mirror images of each other.

Preferably, the invention relates to a drainage system wherein the connecting means and/or latching means of the first bearing element and the second bearing element are configured as a first connecting element and a second connecting element.

Preferably, the invention relates to a drainage system wherein the first connection element is manufactured within the first bearing element and/or the second connection element is manufactured within the second bearing element or is manufactured integrally and/or can be detached therefrom.

Preferably, the invention relates to a drainage system wherein the first bearing element comprises at least one first receiving portion for releasably or non-releasably receiving the first connecting element and/or the second bearing element comprises at least one second receiving portion for releasably or non-releasably receiving the second connecting element.

Preferably, the invention relates to a drainage system wherein the supporting unit and the water discharge unit are formed integrally.

Preferably, the invention relates to a drainage system wherein the supporting unit comprises metal, concrete, polymer concrete, wood, wood-based material or plastic, or a combination thereof.

Preferably, the invention relates to a drainage system, further comprising at least one alignment unit for aligning or fixing the water receiving unit.

Preferably, the invention relates to a drainage system wherein the alignment unit and/or the water receiving unit comprise connecting means and/or latching means, such that they can be connected and/or latched together;

Preferably, the invention relates to a drainage system wherein the alignment unit comprises metal, wood, wood-based material or plastic, or a combination thereof.

Preferably, the invention relates to a drainage system, further comprising at least one further water discharge unit for discharging the water, comprising: another tubular body; and
  a first opening, arranged on the other tubular body, for receiving the water into the other tubular body;
  another opening, arranged along the other tubular body opposite the first opening, for passing the water into the water discharge unit; and
  at least one spacer and/or at least one water passage unit for passing at least part of the water from the other water discharge unit into the water discharge unit.

Preferably, the invention relates to a drainage system wherein the other water discharge unit can be arranged and aligned between the water receiving unit and the water discharge unit, such that the water can be passed from the water receiving unit to the water discharge unit; and the water passage unit can be arranged and aligned between the other water discharge unit and the water discharge unit, such that the water can flow further from the other water discharge unit into the water discharge unit.

Preferably, the invention relates to a drainage system wherein the water receiving unit and/or the other water discharge unit comprise connecting means and/or latching means, such that they can be connected and/or latched together.

Preferably, the invention relates to a drainage system wherein the other water discharge unit and/or the water passage unit comprise connecting means and/or latching means, such that they can be connected and/or latched together.

Preferably, the invention relates to a drainage system wherein the other tubular body is dimensioned for loading at the surface, taking into account its distance from the surface and/or its condition.

Preferably, the invention relates to a drainage system wherein the other tubular body has a first end and a second end arranged face-to-face and comprising connecting means and/or latching means, such that the first end of the other tubular body and the second end of another tubular body can be connected and/or latched together.

Preferably, the invention relates to a drainage system wherein the first end and the second end of the other tubular body are identical or complementary to each other.

Preferably, the invention relates to a drainage system wherein the other tubular body comprises metal, concrete, polymer concrete or plastic or a combination thereof.

Preferably, the invention relates to a drainage system, wherein the other tubular body is formed by a third half-shell body comprising the first opening of the other tubular body and a fourth half-shell body comprising the other opening of the other tubular body.

Preferably, the invention relates to a drainage system wherein the third half-shell body and the fourth half-shell body are substantially identical.

Preferably, the invention relates to a drainage system wherein at least one region for producing the first opening or the other opening of the other tubular body is provided on the third half-shell body or the fourth half-shell body, or in which the first opening and/or the other opening are already produced.

Preferably, the invention relates to a drainage system wherein edge regions of the third half-shell body or the fourth half-shell body are formed in such a way that they can be stacked inside each other and/or on top of each other.

Preferably, the invention relates to a drainage system wherein the edge regions of the third half-shell body or the fourth half-shell body comprise inwardly projecting beads, tapering beads, converging beads, and/or conical beads.

Preferably, the invention relates to a drainage system wherein the third half-shell body and/or the fourth half-shell body comprise connecting means and/or latching means, such that they can be connected and/or latched together.

Preferably, the invention relates to a drainage system wherein the water passage unit and/or the water discharge unit comprise connecting means and/or latching means, such that they can be connected and/or latched together.

Preferably, the invention relates to a drainage system wherein the water passage unit comprises metal, concrete, polymer concrete or plastic, or a combination thereof.

Preferably, the invention relates to a drainage system, further comprising at least one cavity for storing water flowing from the water discharge unit.

Preferably, the invention relates to a drainage system wherein the cavity is formed by a water-permeable material or geotextile material.

Preferably, the invention relates to a drainage system wherein the cavity comprises a highly absorbent material or a water absorbent material.

Preferably, the invention relates to a drainage system wherein the cavity is connected to the water receiving unit, the water feeding unit, the water discharge unit, and/or the water passage unit.

Preferably, the invention relates to a drainage system, further comprising at least one cast body unit for receiving the drainage system.

Preferably, the invention relates to a drainage system wherein the cast body unit is prefabricated with the drainage system.

Preferably, the invention relates to a drainage system wherein the cast body unit comprises metal, plastic, composite, concrete, polymer concrete, normal concrete, reinforced concrete, or asphalt concrete, or a combination thereof.

The invention relates to a water receiving unit for a drainage system, the drainage system comprising:

at least one water discharge unit for discharging the water, comprising:
    a tubular body; and
    a first opening disposed on the tubular body for receiving water into the tubular body; or
at least one cover unit for covering the water receiving unit;
or
at least one water feeding unit for feeding the water from the water receiving unit into the water discharge unit; or
at least one supporting unit for supporting the water discharge unit; or at least one alignment unit for aligning or fixing the water receiving unit; or
at least one other water discharge unit for discharging the water, comprising:
    another tubular body; and
    a first opening, arranged on the other tubular body, for receiving the water into the other tubular body;
    another opening, arranged along the other tubular body opposite the first opening, for passing the water into the water discharge unit; or
at least one water passage unit for passing at least a portion of the water from the other water discharge unit into the water discharge unit; or
at least one cavity for storing the water flowing from the water discharge unit; or
at least one cast body unit for receiving the drainage system; wherein:
    the water receiving unit comprises:
        a water receptacle for receiving water from an adjoining surface; and
        a first neck piece connected to the water receptacle and arrangeable to allow water to flow out of the water receiving unit through an opening of the first neck piece; or
    the water discharge unit can be arranged and aligned below the surface such that the opening of the first neck piece and the first opening of the tubular body can be connected and the water flowing out of the water receiving unit can flow into the water discharge unit; or
    the water feeding unit can be arranged and aligned between the water receiving unit and the water discharge unit such that the opening of the first neck piece can be connected to a first opening of the water feeding unit and the first opening of the tubular body can be connected to a second opening of the water feeding unit, and the water flowing out of the water receiving unit can flow through the water feeding unit into the water discharge unit; or
    the other water discharge unit can be arranged and aligned between the water receiving unit and the water discharge unit such that the water can be passed from the water receiving unit to the water discharge unit; and
    the water passage unit can be arranged and aligned between the other water discharge unit and the water discharge unit in such a way that the water can continue to flow from the other water discharge unit into the water discharge unit.

Preferably, the invention relates to a water receiving unit wherein the water receiving unit comprises connecting means and/or latching means, such that it can be connected and/or latched to the water discharge unit.

Preferably, the invention relates to a water receiving unit wherein the water receptacle is configured as a point drainage system.

Preferably, the invention relates to a water receiving unit wherein the water receptacle is configured as a linear drainage system.

Preferably, the invention relates to a water receiving unit, wherein the water receptacle has a first end and a second end arranged face-to-face and comprising connecting means and/or latching means, such that the first end of the water receptacle and the second end of another water receptacle can be connected and/or latched together.

Preferably, the invention relates to a water receiving unit wherein the first end and the second end of the water receptacle are identical or complementary to each other.

Preferably, the invention relates to a water receiving unit, wherein the water receptacle comprises connecting means and/or latching means, such that it can be connected and/or latched to the surface.

Preferably, the invention relates to a water receiving unit, wherein the water discharge unit comprises connecting means and/or latching means, such that it can be connected and/or latched to the water receiving unit.

Preferably, the invention relates to a water receiving unit, wherein the water discharge unit comprises connecting means and/or latching means, such that it can be connected and/or latched to the water receiving unit.

Preferably, the invention relates to a water receiving unit, wherein the water receptacle and the first neck piece are integrally formed.

Preferably, the invention relates to a water receiving unit, wherein the water receptacle and/or the first neck piece comprises metal, concrete, polymer concrete or plastic, or a combination thereof.

Preferably, the invention relates to a water receiving unit, wherein the water receiving unit comprises at least one second neck piece or more connected to the water receptacle and arrangeable such that the water can flow out of the water receiving unit through an opening of the second neck piece.

The invention relates to a water discharge unit for a drainage system, the drainage system comprising:
    at least one water receiving unit, comprising: a water receptacle for receiving water from an adjoining surface; and
    a first neck piece connected to the water receptacle and arrangeable to allow water to flow out of the water receiving unit through an opening of the first neck piece; or
    at least one cover unit for covering the water receiving unit; or
    at least one water feeding unit for feeding the water from the water receiving unit into the water discharge unit; or
    at least one supporting unit for supporting the water discharge unit; or
    at least one alignment unit for aligning and/or fixing the water receiving unit; or
    at least one other water discharge unit for discharging the water, comprising:
        another tubular body; and
        a first opening, arranged on the other tubular body, for receiving the water into the other tubular body;
        another opening, arranged along the other tubular body opposite the first opening, for passing the water into the water discharge unit; or
    at least one water passage unit for passing at least a portion of the water from the other water discharge unit into the water discharge unit; or
    at least one cavity for storing the water flowing from the water discharge unit; or at least one cast body unit for receiving the drainage system; wherein:
the water discharge unit for discharging the water comprises:
a tubular body; and
a first opening disposed on the tubular body for receiving water into the tubular body; or
the water discharge unit can be arranged and aligned below the surface such that the opening of the first neck piece and the first opening of the tubular body can be connected and the water flowing out of the water receiving unit can flow into the water discharge unit; or
the water feeding unit can be arranged and aligned between the water receiving unit and the water discharge unit such that the opening of the first neck piece can be connected to a first opening of the water feeding unit and the first opening of the tubular body can be connected to a second opening of the water feeding unit, and the water flowing out of the water receiving unit can flow through the water feeding unit into the water discharge unit; or
the other water discharge unit can be arranged and aligned between the water receiving unit and the water discharge unit such that the water can be passed from the water receiving unit to the water discharge unit; and
the water passage unit can be arranged and aligned between the other water discharge unit and the water discharge unit in such a way that the water can continue to flow from the other water discharge unit into the water discharge unit.

Preferably, the invention relates to a water discharge unit wherein the water discharge unit comprises a second opening arranged along the tubular body with the first opening, for receiving the water into the tubular body.

Preferably, the invention relates to a water discharge unit wherein the tubular body is dimensioned for loading at the surface, taking into account its distance from the surface and/or its condition.

Preferably, the invention relates to a water discharge unit wherein the tubular body has a first end and a second end arranged face-to-face and comprising connecting means and/or latching means, such that the first end of the tubular body and the second end of another tubular body can be connected and/or latched together.

Preferably, the invention relates to a water discharge unit wherein the first end and the second end of the tubular body are identical or complementary to each other.

Preferably, the invention relates to a water discharge unit wherein the first end of the tubular body is configured as a socket end and the second end of the tubular body is configured as a tip end.

Preferably, the invention relates to a water discharge unit wherein the socket end comprises latching elements, insertion elements, or insertion elements with a startup bevel, which are arranged along a circumference of the tubular body, and the tip end comprises latching regions arranged along the circumference of the tubular body.

Preferably, the invention relates to a water discharge unit, wherein the tubular body comprises metal, concrete, polymer concrete or plastic, or a combination thereof.

Preferably, the invention relates to a water discharge unit wherein the tubular body has a round, oval, triangular, square, pentagonal, hexagonal, rectangular, or square cross-section.

Preferably, the invention relates to a water discharge unit, wherein the tubular body is formed by a channel member and a cover member which comprises the first opening of the tubular body.

Preferably, the invention relates to a water discharge unit wherein the tubular body is formed by a first half-shell body and a second half-shell body which comprises the first opening of the tubular body.

Preferably, the invention relates to a water discharge unit wherein the first half-shell body and the second half-shell body are substantially identical.

Preferably, the invention relates to a water discharge unit wherein at least one region for producing the first opening is provided on the first half-shell body or the second half-shell body or in which the first opening is already produced.

Preferably, the invention relates to a water discharge unit wherein edge regions of the first half-shell body or the second half-shell body are formed in such a way that they can be stacked inside each other and/or on top of each other.

Preferably, the invention relates to a water discharge unit wherein the edge regions of the first half-shell body or the second half-shell body comprise inwardly projecting beads, tapering beads, converging beads, and/or conical beads.

Preferably, the invention relates to a water discharge unit wherein the first half-shell body and/or the second half-shell body comprise connecting means and/or latching means, such that they can be connected and/or latched together.

Preferably, the invention relates to a water discharge unit wherein the water discharge unit comprises connecting means and/or latching means, such that it can be connected and/or latched to the water receiving unit or the water passage unit.

Preferably, the invention relates to a water discharge unit wherein the tubular body is formed by a third half-shell body comprising the first opening of the tubular body and a fourth half-shell body comprising the other opening of the tubular body.

Preferably, the invention relates to a water discharge unit wherein the third half-shell body and the fourth half-shell body are substantially identical.

Preferably, the invention relates to a water discharge unit wherein at least one region for producing the first opening or the other opening of the tubular body is provided on the third half-shell body or the fourth half-shell body, or in which the first opening and/or the other opening are already produced.

Preferably, the invention relates to a water discharge unit wherein edge regions of the third half-shell body or the fourth half-shell body are formed in such a way that they can be stacked inside each other and/or on top of each other.

Preferably, the invention relates to a water discharge unit wherein the edge regions of the third half-shell body or the fourth half-shell body comprise inwardly projecting beads, tapering beads, converging beads, and/or conical beads.

Preferably, the invention relates to a water discharge unit wherein the third half-shell body and/or the fourth half-shell body comprise connecting means and/or latching means, such that they can be connected and/or latched together.

The invention relates to a cover unit for a drainage system, the drainage system comprising:
at least one water receiving unit, comprising:
a water receptacle for receiving water from an adjoining surface; and
a first neck piece connected to the water receptacle and arrangeable to allow water to flow out of the water receiving unit through an opening of the first neck piece; or at least one water discharge unit for discharging the water, comprising:
a tubular body; and
a first opening disposed on the tubular body for receiving water into the tubular body; or
at least one water feeding unit for feeding the water from the water receiving unit into the water discharge unit; or
at least one supporting unit for supporting the water discharge unit; or at least one alignment unit for aligning or fixing the water receiving unit; or
at least one other water discharge unit for discharging the water, comprising:
another tubular body; and
a first opening, arranged on the other tubular body, for receiving the water into the other tubular body;
another opening, arranged along the other tubular body opposite the first opening, for passing the water into the water discharge unit; or
at least one water passage unit for passing at least a portion of the water from the other water discharge unit into the water discharge unit; or
at least one cavity for storing the water flowing from the water discharge unit; or
at least one cast body unit for receiving the drainage system; wherein:
the water discharge unit can be arranged and aligned below the surface such that the opening of the first neck piece and the first opening of the tubular body can be connected and the water flowing out of the water receiving unit can flow into the water discharge unit; or
the cover unit is configured to cover the water receiving unit; or
the water feeding unit can be arranged and aligned between the water receiving unit and the water discharge unit such that the opening of the first neck piece can be connected to a first opening of the water feeding unit and the first opening of the tubular body can be connected to a second opening of the water feeding unit, and the water flowing out of the water receiving unit can flow through the water feeding unit into the water discharge unit; or
the other water discharge unit can be arranged and aligned between the water receiving unit and the water discharge unit such that the water can be passed from the water receiving unit to the water discharge unit; and
the water passage unit can be arranged and aligned between the other water discharge unit and the water discharge unit in such a way that the water can continue to flow from the other water discharge unit into the water discharge unit.

Preferably, the invention relates to a cover unit, wherein the cover unit has a first end and a second end which are arranged on the front side and comprise connecting means and/or latching means, such that the first end of the cover unit and the second end of another cover unit can be connected and/or latched to each other.

Preferably, the invention relates to a cover unit wherein the first end and the second end of the cover unit are identical or complementary to each other.

Preferably, the invention relates to a cover unit wherein the cover unit comprises at least one opening for letting the water through.

Preferably, the invention relates to a cover unit wherein the cover unit comprises at least one rib for guiding the water and/or for stabilizing the water receptacle.

Preferably, the invention relates to a cover unit, wherein the cover unit comprises metal, concrete, polymer concrete or plastic, or a combination thereof.

Preferably, the invention relates to a cover unit, wherein the cover unit and/or the water receiving unit comprise connecting means and/or latching means, such that they can be connected and/or latched together.

Preferably, the invention relates to a cover unit wherein the water receiving unit comprises a latching element and the cover unit comprises a latching region.

The invention relates to a water feeding unit for a drainage system, the drainage system comprising:
at least one water receiving unit, comprising:
a water receptacle for receiving water from an adjoining surface; and
a first neck piece connected to the water receptacle and arrangeable to allow water to flow out of the water receiving unit through an opening of the first neck piece; or
at least one water discharge unit for discharging the water, comprising:
a tubular body; and
a first opening disposed on the tubular body for receiving water into the tubular body; or
at least one cover unit for covering the water receiving unit;
or
at least one supporting unit for supporting the water discharge unit; or
at least one alignment unit for aligning or fixing the water receiving unit; or
at least one other water discharge unit for discharging the water, comprising:
another tubular body; and
a first opening, arranged on the other tubular body, for receiving the water into the other tubular body;
another opening, arranged along the other tubular body opposite the first opening, for passing the water into the water discharge unit; or
at least one water passage unit for passing at least a portion of the water from the other water discharge unit into the water discharge unit; or
at least one cavity for storing the water flowing from the water discharge unit; or
at least one cast body unit for receiving the drainage system; wherein:
the water discharge unit can be arranged and aligned below the surface such that the opening of the first neck piece and the first opening of the tubular body can be connected and the water flowing out of the water receiving unit can flow into the water discharge unit; or
the water feeding unit is adapted to discharge the water from the water receiving unit into the water discharge unit; or
the water feeding unit can be arranged and aligned between the water receiving unit and the water discharge unit such that the opening of the first neck piece can be connected to a first opening of the water feeding unit and the first opening of the tubular body can be connected to a second opening of the water feeding unit, and the water flowing out of the water receiving unit can flow through the water feeding unit into the water discharge unit; or the other water discharge unit can be arranged and aligned between the water receiving unit and the water discharge unit such that the water can be passed from the water receiving unit to the water discharge unit; and the water passage unit can be arranged and aligned between the other water discharge unit and the water discharge unit in such a way that the water can continue to flow from the other water discharge unit into the water discharge unit.

Preferably, the invention relates to a water feeding unit, wherein the water feeding unit is of adjustable height, telescoping, or folded in concertina fashion.

Preferably, the invention relates to a water feeding unit, wherein the water feeding unit comprises metal, concrete, polymer concrete, clay, stoneware or plastic, or a combination thereof.

The invention relates to a supporting unit for a drainage system, the drainage system comprising:
- at least one water receiving unit, comprising: a water receiving unit for receiving water from an adjoining surface; and
  a first neck piece connected to the water receptacle and arrangeable to allow water to flow out of the water receiving unit through an opening of the first neck piece; or
- at least one water discharge unit for discharging the water, comprising:
  a tubular body; and
  a first opening disposed on the tubular body for receiving water into the tubular body; or
- at least one cover unit for covering the water receiving unit; or
- at least one water feeding unit for feeding the water from the water receiving unit into the water discharge unit; or
- at least one alignment unit for aligning or fixing the water receiving unit; or
- at least one other water discharge unit for discharging the water, comprising:
  another tubular body; and
  a first opening, arranged on the other tubular body, for receiving the water into the other tubular body;
  another opening, arranged along the other tubular body opposite the first opening, for passing the water into the water discharge unit; or
- at least one water passage unit for passing at least a portion of the water from the other water discharge unit into the water discharge unit; or
- at least one cavity for storing the water flowing from the water discharge unit; or
- at least one cast body unit for receiving the drainage system; wherein:
  the water discharge unit can be arranged and aligned below the surface such that the opening of the first neck piece and the first opening of the tubular body can be connected and the water flowing out of the water receiving unit can flow into the water discharge unit; or
  the water feeding unit can be arranged and aligned between the water receiving unit and the water discharge unit such that the opening of the first neck piece can be connected to a first opening of the water feeding unit and the first opening of the tubular body can be connected to a second opening of the water feeding unit, and the water flowing out of the water receiving unit can flow through the water feeding unit into the water discharge unit; or
  the supporting unit is configured to support the water discharge unit; or
  the other water discharge unit can be arranged and aligned between the water receiving unit and the water discharge unit such that the water can be passed from the water receiving unit to the water discharge unit; and
  the water passage unit can be arranged and aligned between the other water discharge unit and the water discharge unit in such a way that the water can continue to flow from the other water discharge unit into the water discharge unit.

Preferably, the invention relates to a supporting unit, wherein the supporting unit and/or the water discharge unit comprise connecting means and/or latching means, such that they can be connected and/or latched together.

Preferably, the invention relates to a supporting unit, wherein the supporting unit is configured such that it can be stacked with other supporting units.

Preferably, the invention relates to a supporting unit, wherein the supporting unit is formed in one piece.

Preferably, the invention relates to a supporting unit, wherein the supporting unit is formed in multiple parts.

Preferably, the invention relates to a supporting unit, wherein the supporting unit comprises a first bearing element and a second bearing element for receiving the water discharge unit.

Preferably, the invention relates to a supporting unit, wherein the first bearing element and/or the second bearing element comprise connecting means and/or latching means, such that they can be connected and/or latched to each other.

Preferably, the invention relates to a drainage system wherein the first bearing element is configured as a first side element and the second bearing element is configured as a second side element.

Preferably, the invention relates to a supporting unit, wherein the first bearing element and the second bearing element are manufactured in one piece and/or can be separated from each other.

Preferably, the invention relates to a supporting unit, wherein the first bearing element and the second bearing element are identical or complementary or mirror images of each other.

Preferably, the invention relates to a supporting unit, wherein the connecting means and/or latching means of the first bearing element and the second bearing element are configured as a first connecting element and a second connecting element.

Preferably, the invention relates to a supporting unit, wherein the first connecting element is manufactured within the first bearing element and/or the second connecting element is manufactured within the second bearing element or can be manufactured integrally and/or detached therefrom.

Preferably, the invention relates to a supporting unit, wherein the first bearing element comprises at least one first receiving area for releasably or non-releasably receiving the first connecting element and/or the second bearing element comprises at least one second receiving area for releasably or non-releasably receiving the second connecting element.

Preferably, the invention relates to a supporting unit, wherein the supporting unit and the water discharge unit are formed integrally.

Preferably, the invention relates to a supporting unit, wherein the supporting unit comprises metal, concrete, polymer concrete, wood, wood-based material or plastic, or a combination thereof.

The invention relates to an alignment unit for a drainage system, the drainage system comprising:
- at least one water receiving unit, comprising:
  - a water receptacle for receiving water from an adjoining surface; and
  - a first neck piece connected to the water receptacle and arrangeable to allow water to flow out of the water receiving unit through an opening of the first neck piece; or
- at least one water discharge unit for discharging the water, comprising:
  - a tubular body; and
  - a first opening disposed on the tubular body for receiving water into the tubular body; or
- at least one cover unit for covering the water receiving unit; or
- at least one water feeding unit for feeding the water from the water receiving unit into the water discharge unit; or
- at least one supporting unit for supporting the water discharge unit; or
- at least one other water discharge unit for discharging the water, comprising:
  - another tubular body; and
  - a first opening, arranged on the other tubular body, for receiving the water into the other tubular body;
  - another opening, arranged along the other tubular body opposite the first opening, for passing the water into the water discharge unit; or
- at least one water passage unit for passing at least a portion of the water from the other water discharge unit into the water discharge unit; or
- at least one cavity for storing the water flowing from the water discharge unit; or
- at least one cast body unit for receiving the drainage system; wherein:
  - the water discharge unit can be arranged and aligned below the surface such that the opening of the first neck piece and the first opening of the tubular body can be connected and the water flowing out of the water receiving unit can flow into the water discharge unit; or
  - the water feeding unit can be arranged and aligned between the water receiving unit and the water discharge unit such that the opening of the first neck piece can be connected to a first opening of the water feeding unit and the first opening of the tubular body can be connected to a second opening of the water feeding unit, and the water flowing out of the water receiving unit can flow through the water feeding unit into the water discharge unit; or
  - the alignment unit is configured for aligning or fixing the water receiving unit; or
  - the other water discharge unit can be arranged and aligned between the water receiving unit and the water discharge unit such that the water can be passed from the water receiving unit to the water discharge unit; and
  - the water passage unit can be arranged and aligned between the other water discharge unit and the water discharge unit in such a way that the water can continue to flow from the other water discharge unit into the water discharge unit.

Preferably, the invention relates to an alignment unit, wherein the alignment unit and/or the water receiving unit comprise connecting means and/or latching means, such that they can be connected and/or latched together.

Preferably, the invention relates to an alignment unit, wherein the alignment unit comprises metal, wood, wood-based material or plastic, or a combination thereof.

The invention relates to a water passage unit for a drainage system, the drainage system comprising:
- at least one water receiving unit, comprising: a water receiving unit for receiving water from an adjoining surface; and
  - a first neck piece connected to the water receptacle and arrangeable to allow water to flow out of the water receiving unit through an opening of the first neck piece; or
- at least one water discharge unit for discharging the water, comprising:
  - a tubular body; and
  - a first opening disposed on the tubular body for receiving water into the tubular body; or
- at least one cover unit for covering the water receiving unit; or
- at least one water feeding unit for feeding the water from the water receiving unit into the water discharge unit; or
- at least one supporting unit for supporting the water discharge unit; or at least one alignment unit for aligning or fixing the water receiving unit; or
- at least one other water discharge unit for discharging the water, comprising:
  - another tubular body; and
  - a first opening, arranged on the other tubular body, for receiving the water into the other tubular body;
  - another opening, arranged along the other tubular body opposite the first opening, for passing the water into the water discharge unit or
- at least one cavity for storing the water flowing from the water discharge unit; or
- at least one cast body unit for receiving the drainage system; wherein:
  - the water discharge unit can be arranged and aligned below the surface such that the opening of the first neck piece and the first opening of the tubular body can be connected and the water flowing out of the water receiving unit can flow into the water discharge unit; or
  - the water feeding unit can be arranged and aligned between the water receiving unit and the water discharge unit such that the opening of the first neck piece can be connected to a first opening of the water feeding unit and the first opening of the tubular body can be connected to a second opening of the water feeding unit, and the water flowing out of the water receiving unit can flow through the water feeding unit into the water discharge unit; or
  - the other water discharge unit can be arranged and aligned between the water receiving unit and the water discharge unit such that the water can be passed from the water receiving unit to the water discharge unit; or
  - the water passage unit is configured to pass at least a portion of the water from the other water discharge unit into the water discharge unit; and the water passage unit can be arranged and aligned between the other water discharge unit and the water discharge unit such that the water can continue to flow from the other water discharge unit into the water discharge unit.

Preferably, the invention relates to a water passage unit, wherein the water passage unit comprises connecting means and/or latching means, such that it can be connected and/or latched to the water discharge unit.

Preferably, the invention relates to a water passage unit, wherein the water passage unit comprises metal, concrete, polymer concrete, clay, stoneware or plastic, or a combination thereof.

The invention relates to a cavity for a drainage system, the drainage system comprising:
- at least one water receiving unit, comprising:
  - a water receptacle for receiving water from an adjoining surface; and
  - a first neck piece connected to the water receptacle and arrangeable to allow water to flow out of the water receiving unit through an opening of the first neck piece; or
- at least one water discharge unit for discharging the water, comprising:
  - a tubular body; and
  - a first opening disposed on the tubular body for receiving water into the tubular body; or
- at least one cover unit for covering the water receiving unit; or
- at least one water feeding unit for feeding the water from the water receiving unit into the water discharge unit; or
- at least one supporting unit for supporting the water discharge unit; or
- at least one alignment unit for aligning or fixing the water receiving unit; or
- at least one other water discharge unit for discharging the water, comprising:
  - another tubular body; and
  - a first opening, arranged on the other tubular body, for receiving the water into the other tubular body;
  - another opening, arranged along the other tubular body opposite the first opening, for passing the water into the water discharge unit- or
- at least one water passage unit for passing at least a portion of the water from the other water discharge unit into the water discharge unit; or at least one cast body unit for receiving the drainage system; wherein:
  - the water discharge unit can be arranged and aligned below the surface such that the opening of the first neck piece and the first opening of the tubular body can be connected and the water flowing out of the water receiving unit can flow into the water discharge unit; or
  - the water feeding unit can be arranged and aligned between the water receiving unit and the water discharge unit such that the opening of the first neck piece can be connected to a first opening of the water feeding unit and the first opening of the tubular body can be connected to a second opening of the water feeding unit, and the water flowing out of the water receiving unit can flow through the water feeding unit into the water discharge unit; or
  - the other water discharge unit can be arranged and aligned between the water receiving unit and the water discharge unit such that the water can be passed from the water receiving unit to the water discharge unit; and the water passage unit can be arranged and aligned between the other water discharge unit and the water discharge unit in such a way that the water can continue to flow from the other water discharge unit into the water discharge unit; or
the cavity is configured to store the water flowing from the water discharge unit.

Preferably, the invention relates to a cavity, wherein the cavity is formed by a water-permeable material or geotextile material.

Preferably, the invention relates to a cavity, wherein the cavity comprises a highly absorbent material or a water absorbent material.

Preferably, the invention relates to a cavity, wherein the cavity is connected to the water receiving unit, the water feeding unit, the water discharge unit, and/or the water passage unit The invention relates to a cast body unit for a drainage system, the drainage system comprising:
- at least one water receiving unit, comprising:
  - a water receptacle for receiving water from an adjoining surface; and
  - a first neck piece connected to the water receptacle and arrangeable to allow water to flow out of the water receiving unit through an opening of the first neck piece; or
- at least one water discharge unit for discharging the water, comprising:
  - a tubular body; and
  - a first opening disposed on the tubular body for receiving water into the tubular body; or
- at least one cover unit for covering the water receiving unit; or
- at least one water feeding unit for feeding the water from the water receiving unit into the water discharge unit; or
- at least one supporting unit for supporting the water discharge unit; or
- at least one alignment unit for aligning or fixing the water receiving unit; or
- at least one other water discharge unit for discharging the water, comprising:
  - another tubular body; and
  - a first opening, arranged on the other tubular body, for receiving the water into the other tubular body;
  - another opening, arranged along the other tubular body opposite the first opening, for passing the water into the water discharge unit; or
- at least one water passage unit for passing at least a portion of the water from the other water discharge unit into the water discharge unit; or
- at least one cavity for storing the water flowing from the water discharge unit;
wherein:
  - the water discharge unit can be arranged and aligned below the surface such that the opening of the first neck piece and the first opening of the tubular body can be connected and the water flowing out of the water receiving unit can flow into the water discharge unit; or
  - the water feeding unit can be arranged and aligned between the water receiving unit and the water discharge unit such that the opening of the first neck piece can be connected to a first opening of the water feeding unit and the first opening of the tubular body can be connected to a second opening of the water feeding unit, and the water flowing out of the water receiving unit can flow through the water feeding unit into the water discharge unit; or the other water discharge unit can be arranged and aligned between the water receiving unit and the water discharge unit such that the water can be passed from the water receiving unit to the water discharge unit; and the water passage unit can be arranged and aligned between the other water discharge unit and the water discharge unit in such a way that the water can continue to flow from the other water discharge unit into the water discharge unit; or the cast body unit is configured to accommodate the drainage system.

Preferably, the invention relates to a cast body unit, wherein the cast body unit is prefabricated with the drainage system.

Preferably, the invention relates to a cast body unit, wherein the cast body unit comprises metal, plastic, composite, concrete, polymer concrete, normal concrete, reinforced concrete, or asphalt concrete, or a combination thereof.

The invention relates to a drainage method, comprising:
Providing at least one water receiving unit, comprising:
a water receptacle for receiving water from an adjoining surface; and
a first neck piece connected to the water receptacle and positionable to allow water to flow out of the water receiving unit through an opening of the first neck piece; and
Providing at least one water discharge unit for draining water, comprising:
a tubular body; and
a first opening disposed on the tubular body for receiving water into the tubular body; and
Arranging and aligning the water discharge unit below the surface in such a way that the opening of the first neck piece and the first opening of the tubular body are connected and the water flowing out of the water receiving unit flows into the water discharge unit.

Preferably, the invention relates to a drainage method wherein the water receptacle is configured as a point drainage system.

Preferably, the invention relates to a drainage method wherein the water receptacle is configured as a linear drainage system.

Preferably, the invention relates to a drainage method wherein the water receptacle has a first end and a second end arranged face-to-face and comprising connecting means and/or latching means such that the first end of the water receptacle and the second end of a further water receptacle are connected and/or latched together.

Preferably, the invention relates to a drainage method wherein the first end and the second end of the water receptacle are identical or complementary to each other.

Preferably, the invention relates to a drainage method wherein the water receiving and/or surface comprises connecting means and/or latching means such that they are connected and/or latched.

Preferably, the invention relates to a drainage method wherein the water receptacle and the first neck piece are integrally formed.

Preferably, the invention relates to a drainage method wherein the water receptacle and/or the first neck comprises metal, concrete, polymer concrete or plastic or a combination thereof.

Preferably, the invention relates to a drainage method wherein the water receiving unit comprises at least one second neck piece or further connected to the water receiving unit and arranged such that the water flows out of the water receiving unit through an opening of the second neck piece.

Preferably, the invention relates to a drainage method wherein the water discharge unit comprises a second opening arranged along the tubular body with the first opening, for receiving the water into the tubular body.

Preferably, the invention relates to a drainage method wherein the tubular body is dimensioned for loading at the surface, taking into account its distance from the surface and/or its condition.

Preferably, the invention relates to a drainage method wherein the tubular body has a first end and a second end arranged face-to-face and comprising connecting means and/or latching means such that the first end of the tubular body and the second end of another tubular body are connected and/or latched together.

Preferably, the invention relates to a drainage method wherein the first end and the second end of the tubular body are identical or complementary to each other.

Preferably, the invention relates to a drainage method wherein the first end of the tubular body is configured as a socket end and the second end of the tubular body is configured as a tip end.

Preferably, the invention relates to a drainage method wherein the socket end comprises latching elements, insertion elements, or insertion elements with a startup bevel, which are arranged along a circumference of the tubular body, and the tip end comprises latching regions arranged along the circumference of the tubular body.

Preferably, the invention relates to a drainage method wherein the tubular body comprises metal, concrete, polymer concrete or plastic, or a combination thereof.

Preferably, the invention relates to a drainage method wherein the tubular body has a round, oval, triangular, square, pentagonal, hexagonal, rectangular or square cross-section.

Preferably, the invention relates to a drainage method wherein the tubular body is formed by a channel element and a cover element comprising the first opening of the tubular body.

Preferably, the invention relates to a drainage method wherein the tubular body is formed by a first half-shell body and a second half-shell body comprising the first opening of the tubular body.

Preferably, the invention relates to a drainage method wherein the first half-shell body and the second half-shell body are substantially identical.

Preferably, the invention relates to a drainage method wherein at least one region for producing the first opening is provided on the first half-shell body or the second half-shell body or in which the first opening is already produced.

Preferably, the invention relates to a drainage method wherein edge portions of the first half-shell body or the second half-shell body are formed in such a way that they can be stacked inside each other and/or on top of each other.

Preferably, the invention relates to a drainage method wherein the edge regions of the first half-shell body or the second half-shell body comprise inwardly projecting beads, tapering beads, converging beads and/or conical beads.

Preferably, the invention relates to a drainage method wherein the first half-shell body and/or the second half-shell body comprise connecting means and/or latching means such that they are connected and/or latched to each other.

Preferably, the invention relates to a drainage method, further comprising providing at least one cover unit for covering the water receiving unit.

Preferably, the invention relates to a drainage method, wherein the cover unit has a first end and a second end which are arranged face-to-face and comprise connecting means and/or latching means, such that the first end of the cover unit and the second end of a further cover unit are connected and/or latched to each other.

Preferably, the invention relates to a drainage method wherein the first end and the second end of the cover unit are identical or complementary to each other.

Preferably, the invention relates to a drainage method wherein the cover unit comprises at least one opening for letting the water through.

Preferably, the invention relates to a drainage method wherein the cover unit comprises at least one rib for guiding the water and/or for stabilizing the water receptacle.

Preferably, the invention relates to a drainage method wherein the cover unit comprises metal, concrete, polymer concrete or plastic, or a combination thereof.

Preferably, the invention relates to a drainage method wherein the cover unit and/or the water receiving unit comprise connecting means and/or latching means such that they are connected and/or latched to each other.

Preferably, the invention relates to a drainage method wherein the water receiving unit comprises a latching member and the cover unit comprises a latching region.

Preferably, the invention relates to a drainage method, further comprising providing at least one water feeding unit for feeding the water from the water receiving unit into the water discharge unit.

Preferably, the invention relates to a drainage method wherein the water feeding unit can be arranged and aligned between the water receiving unit and the water discharge unit, such that the opening of the first neck piece can be connected to a first opening of the water feeding unit and the first opening of the tubular body can be connected to a second opening of the water feeding unit, and water flowing from the water receiving unit can flow through the water feeding unit into the water discharge unit.

Preferably, the invention relates to a drainage method wherein the water feeding unit is of adjustable height, telescoping, or folded in concertina fashion.

Preferably, the invention relates to a drainage method, wherein the water feeding unit comprises metal, concrete, polymer concrete, clay, stoneware or plastic, or a combination thereof.

Preferably, the invention relates to a drainage method, further comprising providing at least one supporting unit for supporting the water discharge unit.

Preferably, the invention relates to a drainage method wherein the supporting unit and/or the water discharge unit comprise connecting means and/or latching means such that with each other they are connected and/or latched.

Preferably, the invention relates to a drainage method wherein the supporting unit is formed such that it can be stacked with other storage units.

Preferably, the invention relates to a drainage method wherein the supporting unit is configured in one piece.

Preferably, the invention relates to a drainage method wherein the supporting unit is configured in multiple parts.

Preferably, the invention relates to a drainage method wherein the supporting unit comprises a first bearing element and a second bearing element for receiving the water discharge unit.

Preferably, the invention relates to a drainage method wherein the first bearing element and/or the second bearing element comprise connecting means and/or latching means, such that they can be connected and/or latched to each other.

Preferably, the invention relates to a drainage method wherein the first bearing element is configured as a first side element and the second bearing element is configured as a second side element.

Preferably, the invention relates to a drainage method wherein the first bearing element and the second bearing element are manufactured in one piece and/or can be separated from each other.

Preferably, the invention relates to a drainage method wherein the first bearing element and the second bearing element are identical or complementary or mirror images of each other.

Preferably, the invention relates to a drainage method wherein the connecting means and/or latching means of the first bearing element and the second bearing element are configured as a first connecting element and a second connecting element.

Preferably, the invention relates to a drainage method wherein the first connecting element within the first bearing element and/or the second connecting element within the second bearing element can be manufactured or integrally manufactured and/or detached therefrom.

Preferably, the invention relates to a drainage method wherein the first bearing element comprises at least one first receiving area for releasably or non-releasably receiving the first connecting element and/or the second bearing element comprises at least one second receiving area for releasably or non-releasably receiving the second connecting element.

Preferably, the invention relates to a drainage method wherein the supporting unit and the water discharge unit are formed integrally.

Preferably, the invention relates to a drainage method wherein the supporting unit comprises metal, concrete, polymer concrete, wood, wood-based material or plastic, or a combination thereof.

Preferably, the invention relates to a drainage method, further comprising providing at least one alignment unit for aligning or fixing the water receiving unit.

Preferably, the invention relates to a drainage method wherein the alignment unit and/or the water receiving unit comprise connecting means and/or latching means, such that they are connected and/or latched to each other.

Preferably, the invention relates to a drainage method wherein the alignment unit comprises metal, wood, wood-based material or plastic, or a combination thereof.

Preferably, the invention relates to a drainage method, further comprising: Providing at least one other water discharge unit for draining the water, comprising:
 another tubular body; and
 a first opening, arranged on the other tubular body, for receiving the water into the other tubular body;
 another opening which is arranged along the other tubular body opposite the first opening, for passing the water into the water discharge unit; and
Providing at least one spacer and/or at least one water passage unit for passing at least a portion of the water from the other water discharge unit into the water discharge unit.

Preferably, the invention relates to a drainage method wherein the other water discharge unit is arranged and aligned between the water receiving unit and the water discharge unit in such a way that the water is transferred from the water receiving unit to the water discharge unit.

Preferably, the invention relates to a drainage method wherein the water passage unit is arranged and aligned between the other water discharge unit and the water discharge unit such that the water continues to flow from the other water discharge unit into the water discharge unit.

Preferably, the invention relates to a drainage method wherein the water receiving unit and/or the other water discharging unit comprise connecting means and/or latching means, such that they are connected and/or latched to each other.

Preferably, the invention relates to a drainage method wherein the other water discharge unit and/or the water passage unit comprise connecting means and/or latching means, such that they are connected and/or latched to each other.

Preferably, the invention relates to a drainage method wherein the other tubular body is dimensioned for loading at the surface, taking into account its distance from the surface and/or its condition.

Preferably, the invention relates to a drainage method wherein the other tubular body has a first end and a second end arranged face-to-face and comprising connecting means and/or latching means, such that the first end of the other tubular body and the second end of another tubular body can be connected and/or latched together.

Preferably, the invention relates to a drainage method wherein the first end and the second end of the further tubular body are identical or complementary to each other.

Preferably, the invention relates to a drainage method wherein the other tubular body comprises metal, concrete, polymer concrete or plastic, or a combination thereof.

Preferably, the invention relates to a drainage method wherein the other tubular body is formed by a third half-shell body comprising the first opening of the other tubular body and a fourth half-shell body comprising the other opening of the other tubular body.

Preferably, the invention relates to a drainage method wherein the third half shell body and the fourth half shell body are substantially identical.

Preferably, the invention relates to a drainage method wherein at least one region for producing the first opening or the other opening of the other tubular body is provided on the third half-shell body or the fourth half-shell body, or in which the first opening and/or the other opening are already produced.

Preferably, the invention relates to a drainage method wherein edge portions of the third half-shell body or the fourth half-shell body are formed in such a way that they can be stacked inside each other and/or on top of each other.

Preferably, the invention relates to a drainage method wherein the edge regions of the third half-shell body or the fourth half-shell body comprise inwardly projecting beads, tapering beads, converging beads, and/or conical beads.

Preferably, the invention relates to a drainage method wherein the third half-shell body and/or the fourth half-shell body comprise connecting means and/or latching means, such that they are connected and/or latched to each other.

Preferably, the invention relates to a drainage method wherein the water passage unit and/or the water discharge unit comprise connecting means and/or latching means, such that they are connected and/or latched to each other.

Preferably, the invention relates to a drainage method wherein the water passage unit comprises metal, concrete, polymer concrete or plastic, or a combination thereof.

Preferably, the invention relates to a drainage method, further comprising providing at least one cavity for storing the water flowing from the water discharge unit.

Preferably, the invention relates to a drainage method wherein the cavity is formed by a water-permeable material or geotextile material.

Preferably, the invention relates to a drainage method wherein the cavity comprises a highly absorbent material or a water absorbent material.

Preferably, the invention relates to a drainage method wherein the cavity is connected to the water receiving unit, the water feeding unit, the water discharge unit, and/or the water passage unit.

Preferably, the invention relates to a drainage method, further comprising providing at least one cast body unit for receiving the water receiving unit, water discharging unit, other water discharging unit, covering unit, water feeding unit, supporting unit, aligning unit or water passing unit, or the cavity.

Preferably, the invention relates to a drainage method wherein the cast body unit is prefabricated.

Preferably, the invention relates to a drainage method wherein the cast body unit comprises metal, plastic, composite, concrete, polymer concrete, normal concrete, reinforced concrete, or asphalt concrete, or a combination thereof.

The invention is based on the idea of providing a modular drainage system. This allows the drainage system to be used in a particularly flexible and versatile manner. This can further reduce a space requirement for storage and transport.

The invention is explained in more detail below by means of exemplary embodiments with reference to the enclosed drawings. Wherein.

Figure 16:
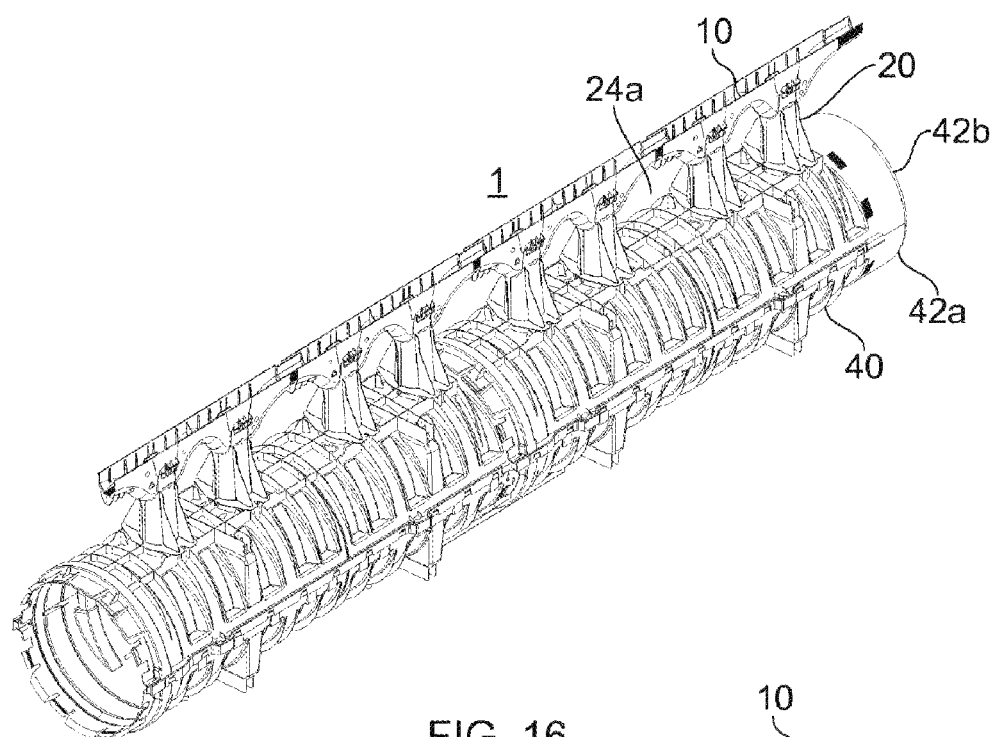
Figure 17:
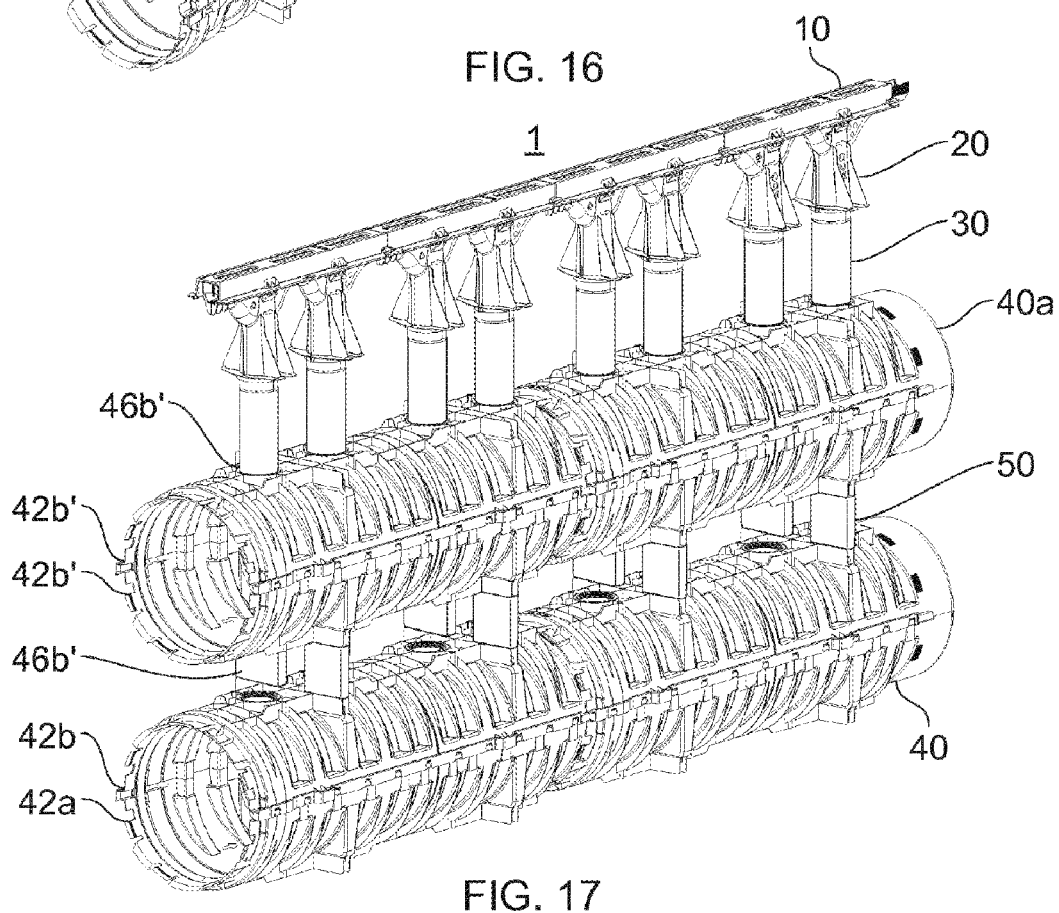
Figure 18:
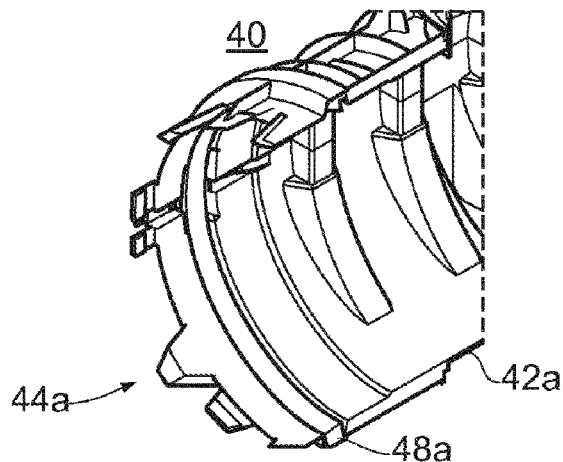
Figure 19:
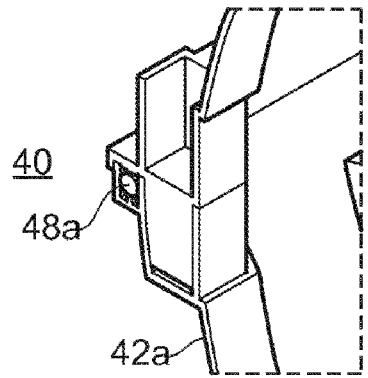
Figure 20:
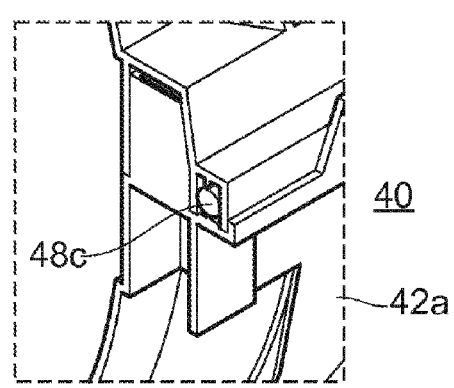
Figure 21:
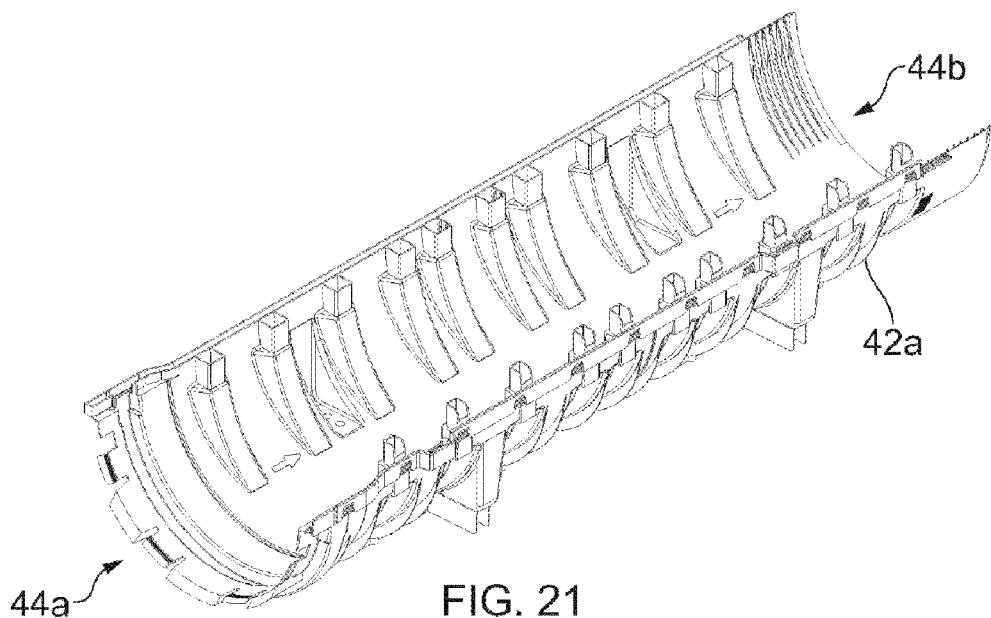
Figure 22:
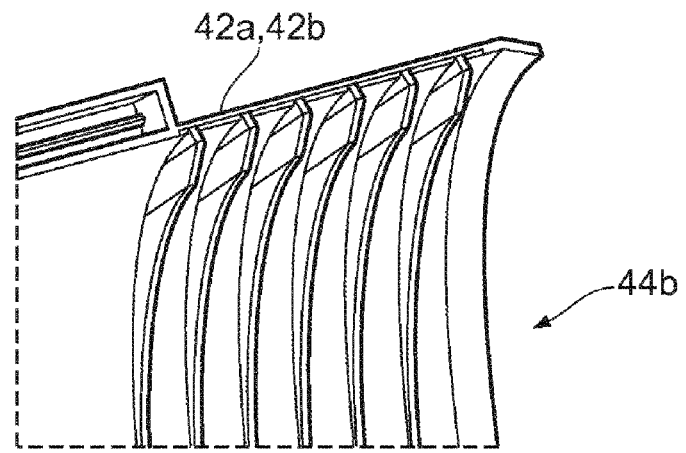
Figure 23:
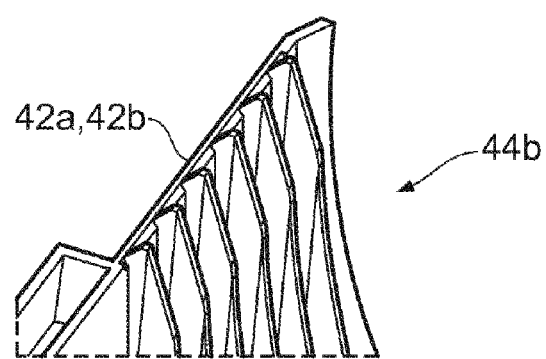
Figure 24:
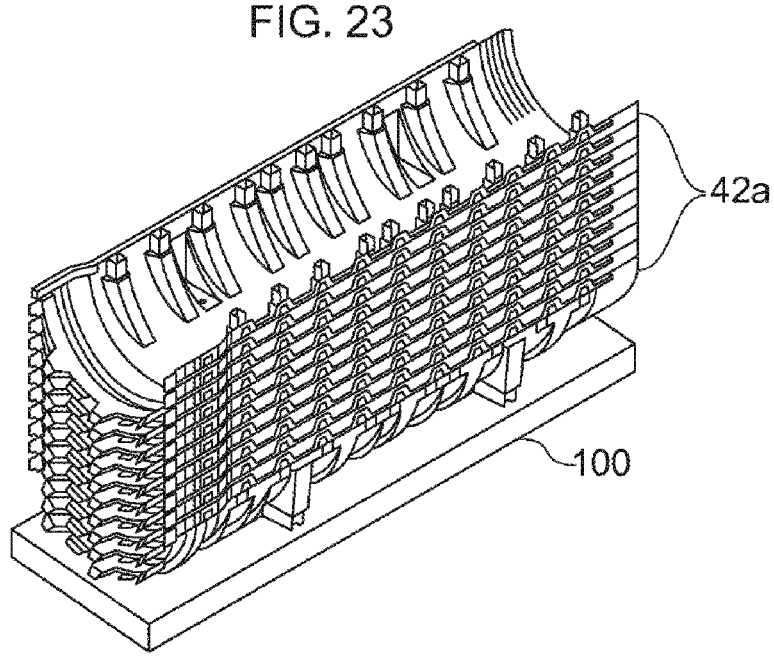
Figure 25:
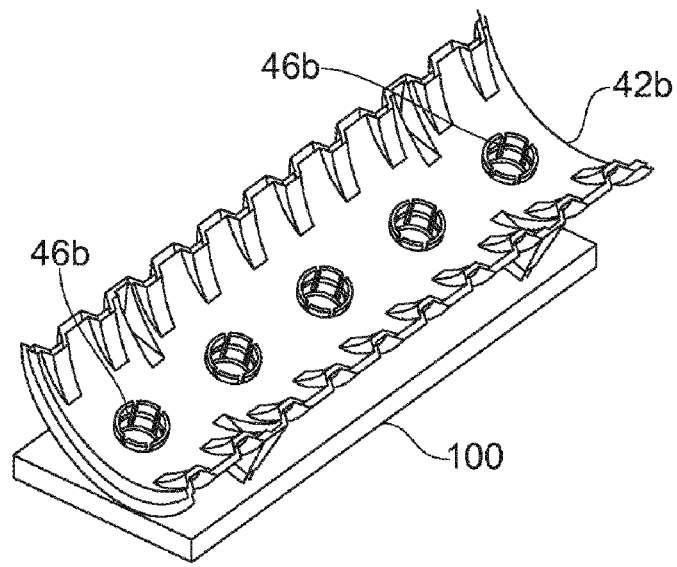
Figure 26:
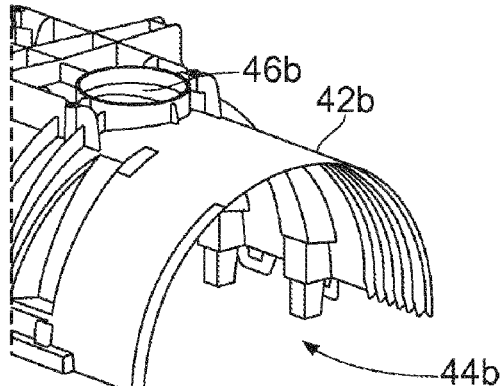
Figure 27:
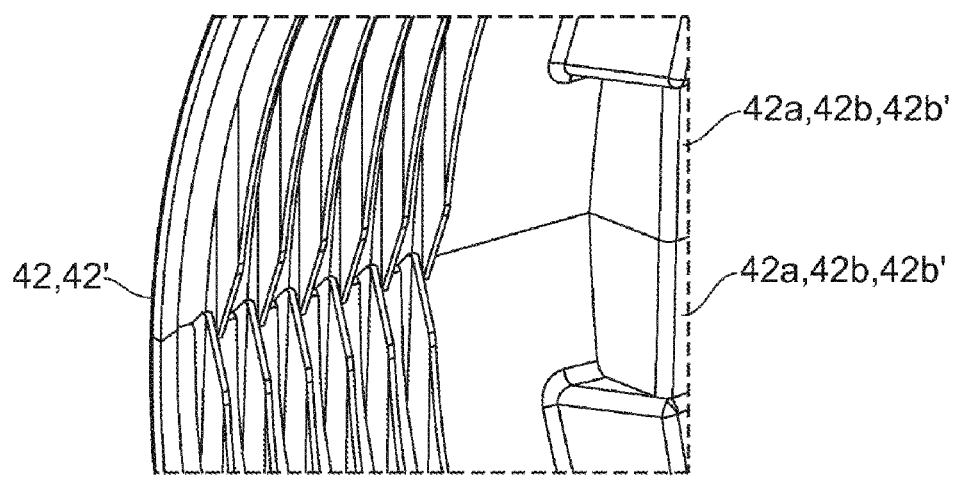
Figure 28:
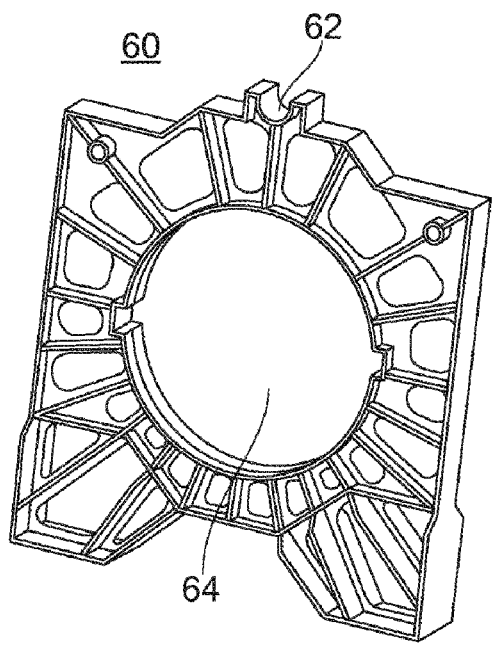
Figure 29:
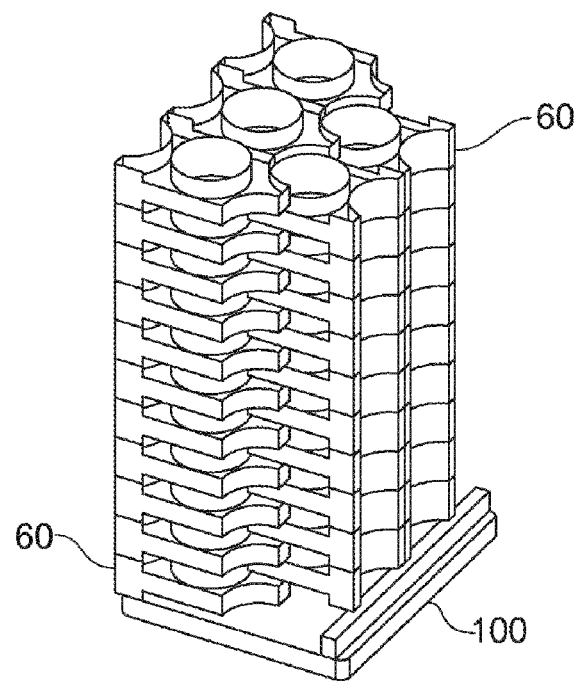
Figure 30:
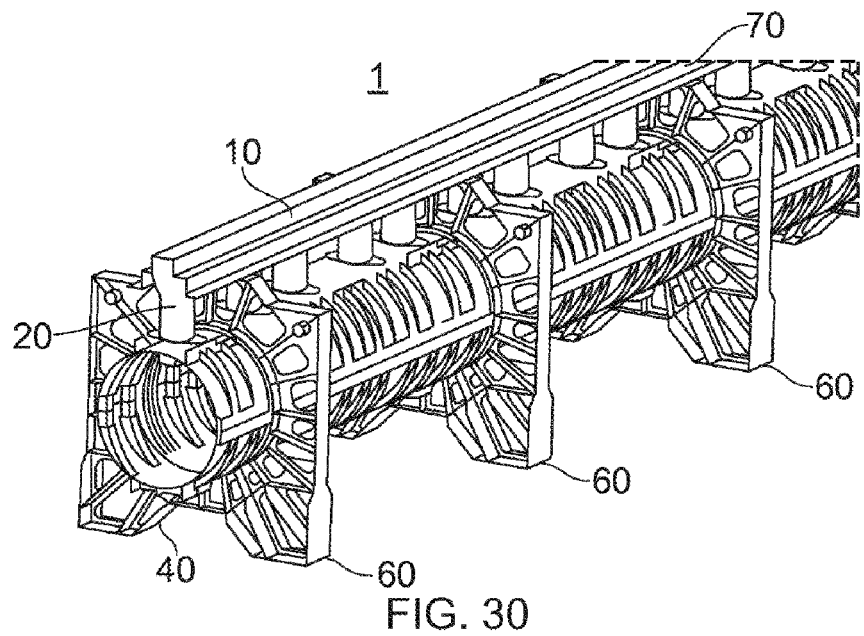
Figure 31:
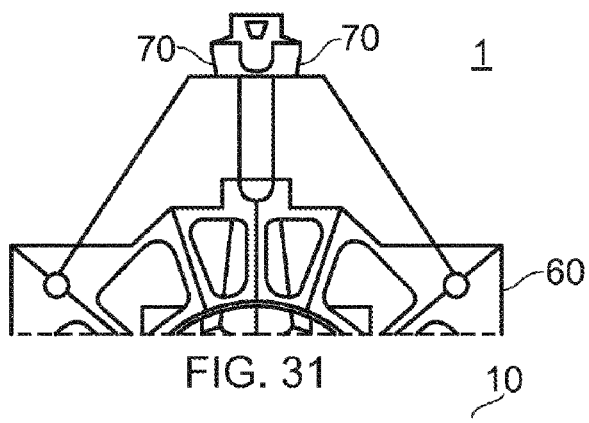

FIG. 16 shows a perspective view of a drainage system 1 comprising another water receiving unit 20 and another water discharge unit 40 according to the embodiment of the invention;

FIG. 17 shows a perspective view of another drainage system 1 comprising other water discharge units 40a and water passage units 50 according to the embodiment of the invention;

FIG. 18 shows an enlarged perspective sectional view of the water discharge unit 40 according to the embodiment of the invention;

FIG. 19 shows an enlarged perspective view of the first end-side opening 44a according to the embodiment of the invention;

FIG. 20 shows another enlarged perspective view of the first end-side opening 44a according to the embodiment of the invention;

FIG. 21 shows a perspective view of the first half-shell body 42a according to the embodiment of the invention;

FIG. 22 shows an enlarged perspective view of the second end-side opening 44b of a half-shell body 42a, 42b according to the embodiment of the invention;

FIG. 23 shows an enlarged perspective view of the second end-side opening 44b of a half-shell body 42a, 42b according to another embodiment of the invention;

FIG. 24 shows a perspective view of a plurality of half-shell bodies according to the embodiment of the invention;

FIG. 25 shows a perspective view of another plurality of half-shell bodies according to the embodiment of the invention:

FIG. 26 shows an enlarged perspective top view of the second half-shell body 42b according to the embodiment of the invention;

FIG. 27 shows an enlarged perspective view of the second end-side opening 44b of a tubular body 42, 42' according to the other embodiment of the invention;

FIG. 28 shows a perspective view of a supporting unit 60 according to the embodiment of the invention;

FIG. 29 shows a perspective view of a plurality of supporting units 60 according to the embodiment of the invention;

FIG. 30 shows a perspective view of a drainage system 1 comprising water receiving units 20, water discharge units 40, and supporting units 60 according to the embodiment of the invention;

FIG. 31 shows an end-side view, and

Figure 32:
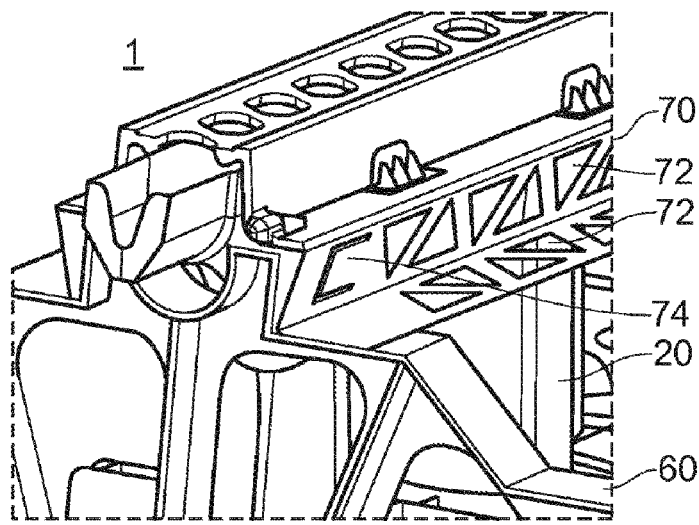
Figure 33:
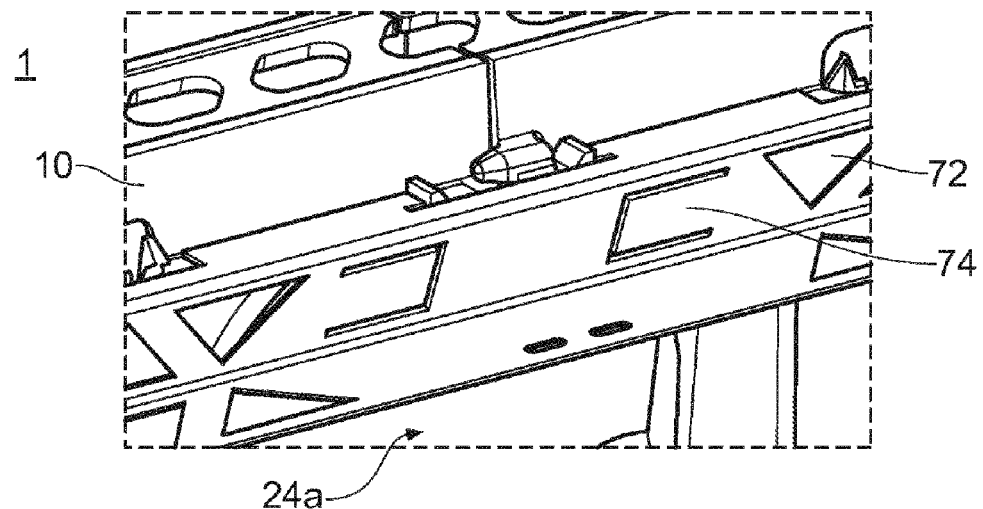
Figure 34:
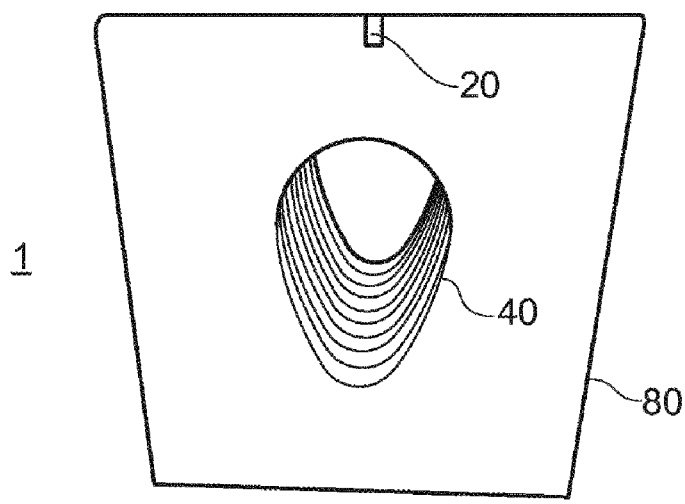
Figure 35:
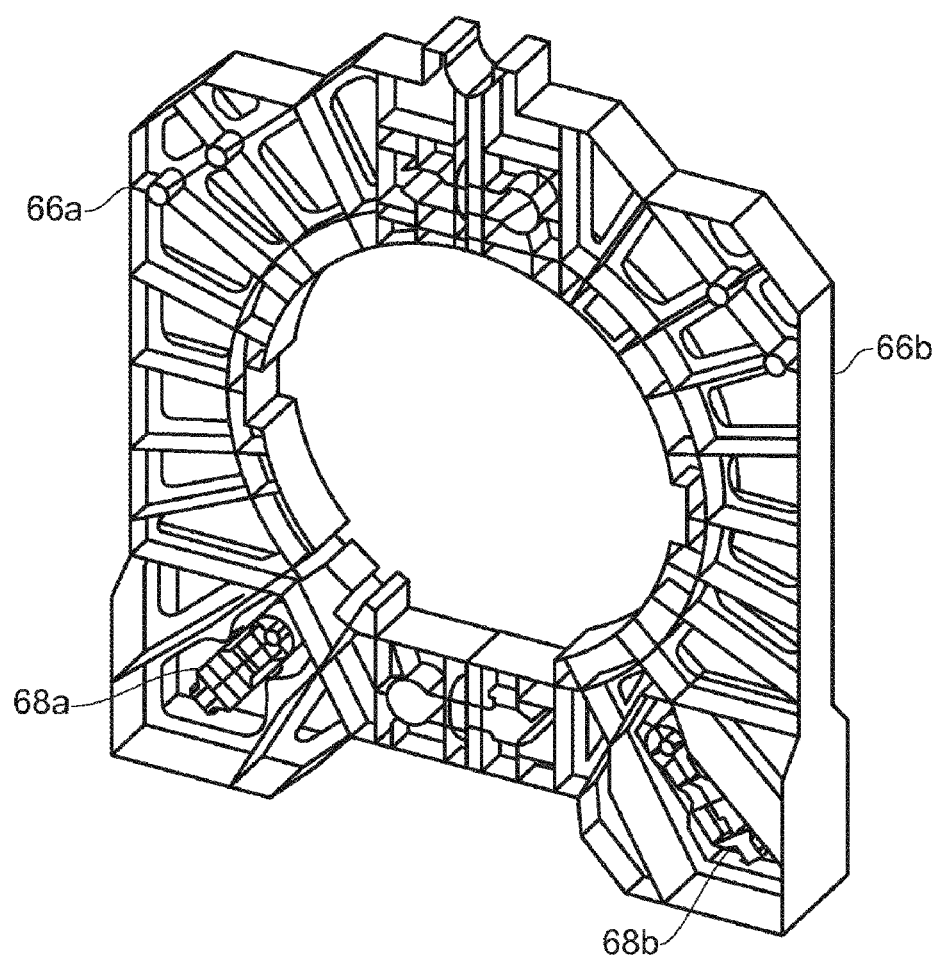
Figure 36:
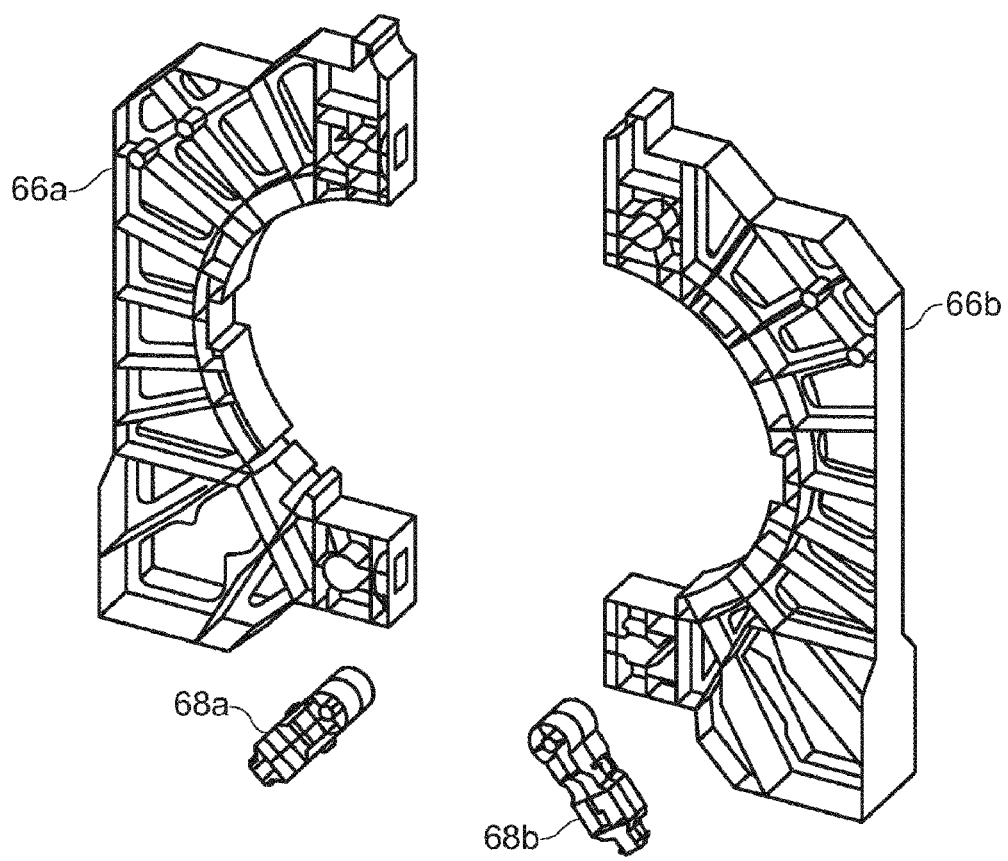
Figure 37:
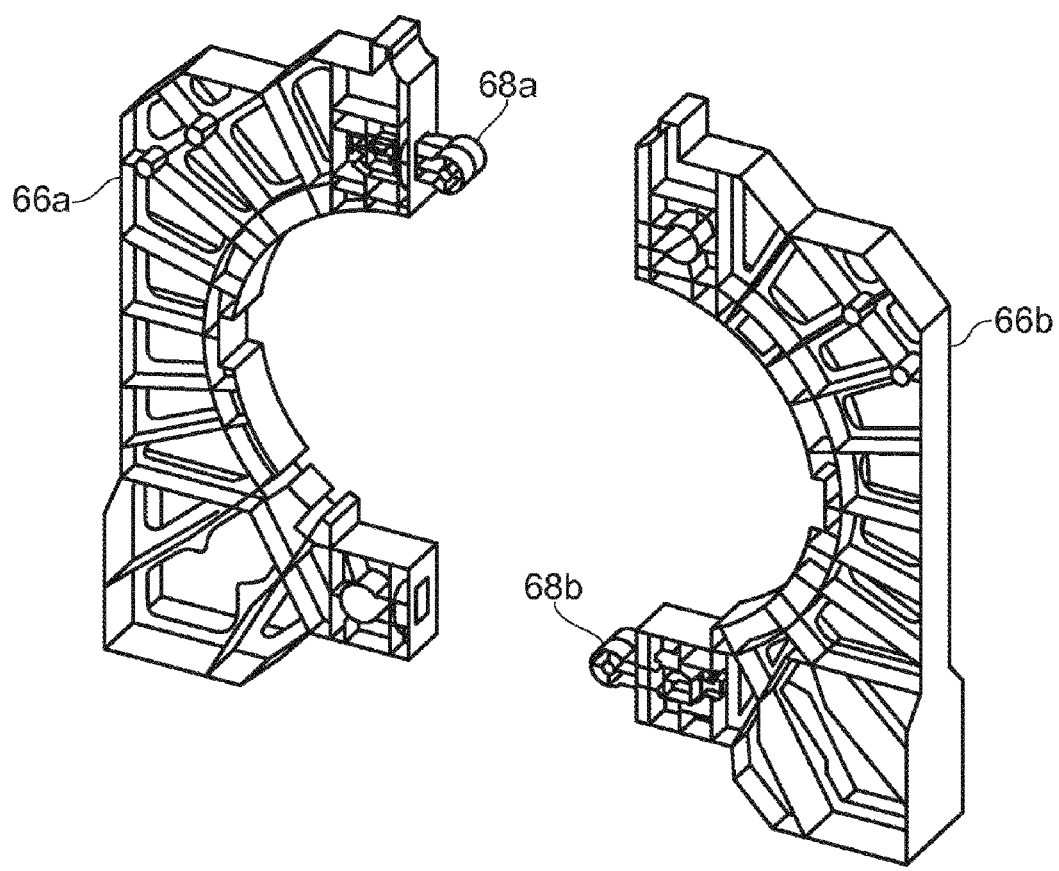
Figure 38:
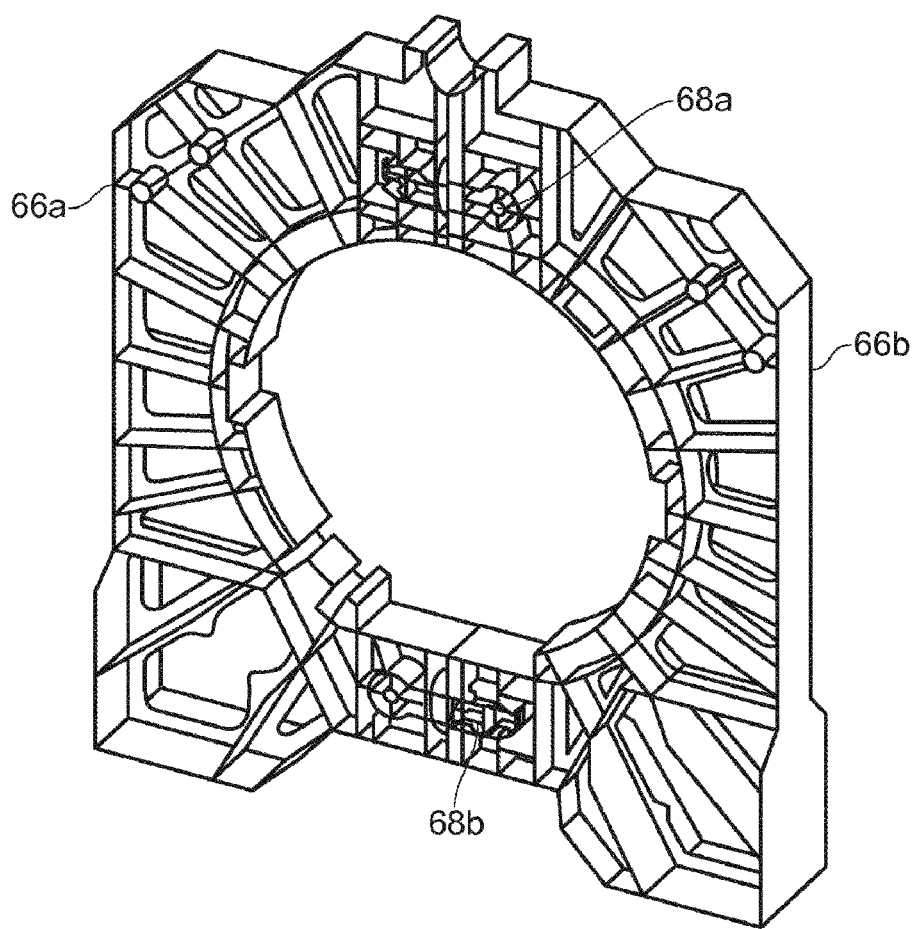
Figure 39:
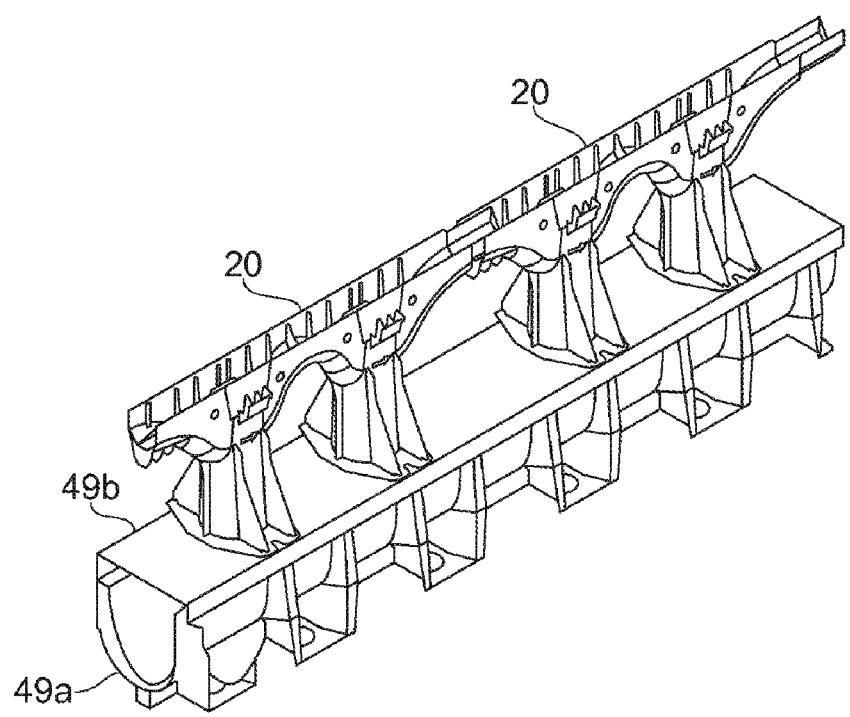

FIG. 32 shows an enlarged perspective view of a drainage system 1, further comprising alignment units 70 according to the embodiment of the invention;

FIG. 33 shows an enlarged perspective view of an alignment unit 70 according to the embodiment of the invention;

FIG. 34 shows a perspective view of a drainage system 1, further comprising a cast body unit 80 according to another embodiment of the invention;

FIG. 35 shows a perspective view of a supporting unit 60 according to another embodiment of the invention in a first, unseparated state;

FIG. 36 shows a perspective view of the supporting unit 60 according to the other embodiment of the invention in a second, separated state;

FIG. 37 shows a perspective view of the supporting unit 60 according to the other embodiment of the invention in a third, prepared state;

FIG. 38 shows a perspective view of the supporting unit 60 according to the other embodiment of the invention in a fourth, connected state; and FIG. 39 shows a perspective view of a water discharge unit 40 according to another embodiment of the invention.

In the description below, like reference numerals are used for like parts and parts with the same effect.

Figure 1:
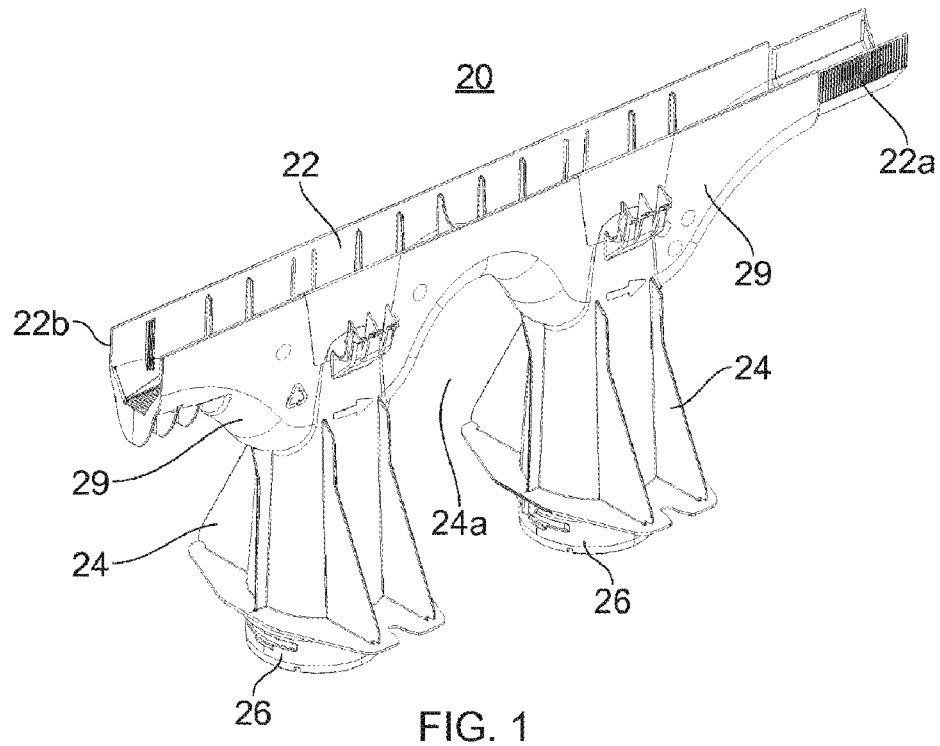
FIG. 1 shows a perspective view of a water receiving unit 20 according to an embodiment of the present invention.

FIG. 1 shows a perspective view of a water receiving unit 20 according to an embodiment of the present invention. The water receiving unit 20 includes a water receptacle 22 comprising a first end 22a and a first end 22b, and neck pieces 24, each comprising an opening 26. The water receiving unit 20 may further comprise a cross rib 28. The cross rib 28 may be used to stiffen the water receptacle 22. The water receiving unit 20 may further include latching elements 29. Alternatively, or in addition, the water receiving unit 20 may include latching regions. A neck piece space 24a is located between two respective neck pieces 24. When the water receiving unit 20 is used, i.e., when the water receiving unit 20 is installed in a surface to be drained, such as a railroad, a square, or a road, a material such as sand, gravel, crushed stone, and concrete, in which the water receiving unit 20 is embedded, may become embedded in the neck piece spaces 24a from one side or both sides of the water receiving unit 20, thereby enclosing the neck pieces 24, respectively.

Figure 2:
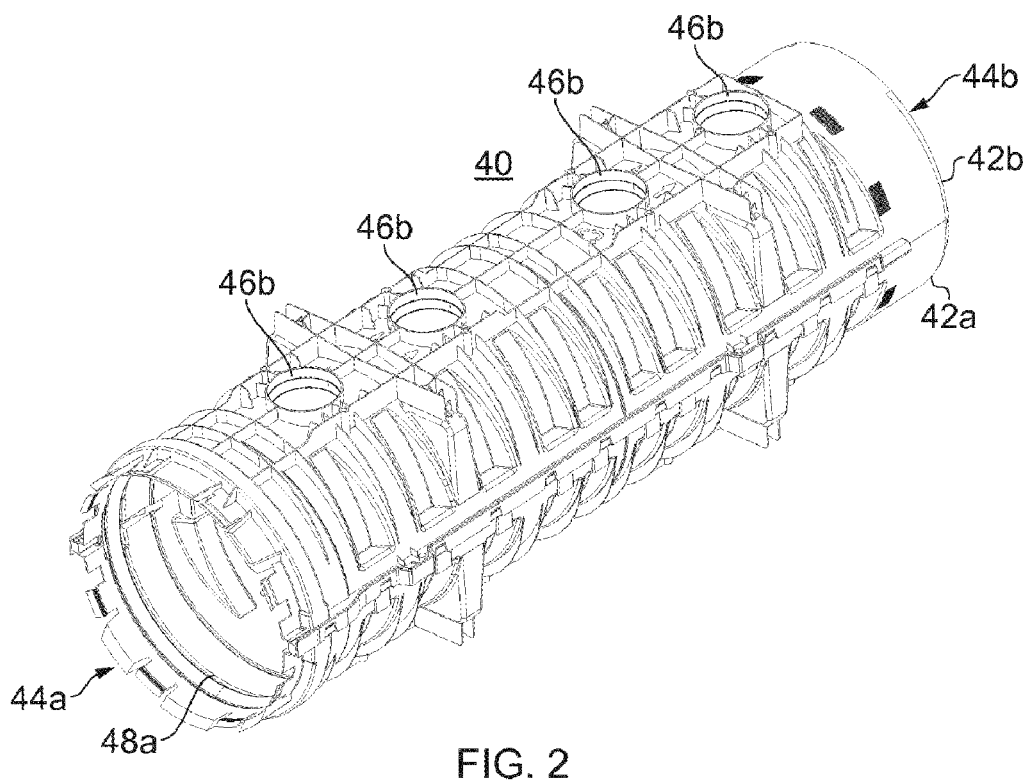
FIG. 2 shows a perspective view of a water discharge unit 40 according to the embodiment of the invention.

FIG. 2 shows a perspective view of a water discharge unit 40 according to the embodiment of the invention. The water discharge unit 40 includes a tubular body 42 comprising a first end-side opening 44a and a second end-side opening 44b and openings 46b. The tubular body 42 may include a first half-shell body 42a without the openings and a second half-shell body 42b with the openings 46b. The tubular body 42 may have a round, oval, triangular, square, pentagonal, hexagonal, rectangular, or square cross-section, for example.

FIG. 39 shows a perspective view of a water discharge unit 40 according to another embodiment of the invention. It is also possible that the tubular body is formed by a channel element 49a, for example a drainage channel element, which is or will be provided with a cover element 49b, for example a cover. The channel element 49a and/or the cover element 49b may include connecting means and/or latching means, such that they can be connected and/or latched together. The cover member 49b includes at least one opening 46b that is or will be connected to the water receiving unit 20 or the water feeding unit 30. Furthermore, two channel elements can also form a tubular body, or the cover element 49b can form a closed tube together with a channel element 49a.

It is also conceivable to arrange the water receiving unit 20 on an infiltration ditch, for example a packed bed infiltration ditch, such that water can flow from the water receiving unit 20 into the infiltration ditch, possibly in combination with the water feeding unit 30.

The first end-side opening 44a may include a circumferential seal 48a. The first end-side opening 44a may include latching elements, as shown in FIG. 2, and the second end-side opening 44b may include mating latching regions. The first end-side opening 44a may include insertion guides, as shown in FIG. 2. Alternatively, the first end-side opening 44a and the second end-side opening 44b may have alternating latching elements and latching regions. The water discharge unit 40 conducts water from the first end-side opening 44a to the second end-side opening 44b. The latching elements and/or bevels can have bevels or startup bevels. The water discharge unit 40, tubular body 42, and/or half-shell bodies 42a, 42b may comprise materials such as metal, concrete, polymer concrete, clay, stoneware, and/or plastic. The water discharge unit 40, the tubular body 42, and/or the half-shell bodies 42a, 42b may have a substantially uniform wall thickness or differ in wall thickness. The water discharge unit 40, the tubular body 42, and/or the half-shell bodies 42a, 42b may have beads. The beads can increase a geometric rigidity of the water discharge unit 40, the tubular body 42, and/or the half-shell bodies 42a, 42b and/or can achieve a stacking height of half-shell bodies 42a, 42b stacked inside each other. The beads may protrude into the water discharge unit 40, the tubular body 42, and the half-shell bodies 42a, 42b, respectively. The beads may extend from edge portions of the half-shell bodies 42a, 42b toward a circumference of the water discharge unit 40. The beads can be tapered, converging, and/or conical, such that they eventually taper out. Their thickness or height and/or width can decrease from the edge area. Their thickness or height and/or width can be adjusted to the wall thickness. Thus, the half-shell bodies 42a, 42b can be stacked into each other vertically and/or without a lateral offset. This allows to minimize the stacking height, a required floor space, and/or to reduce a risk of damage.

The tubular body 42 may comprise two half-shell bodies 42a without the openings 46b. Thus, water drainage can be realized via areas without water receiving unit(s) 20.

Figure 3:
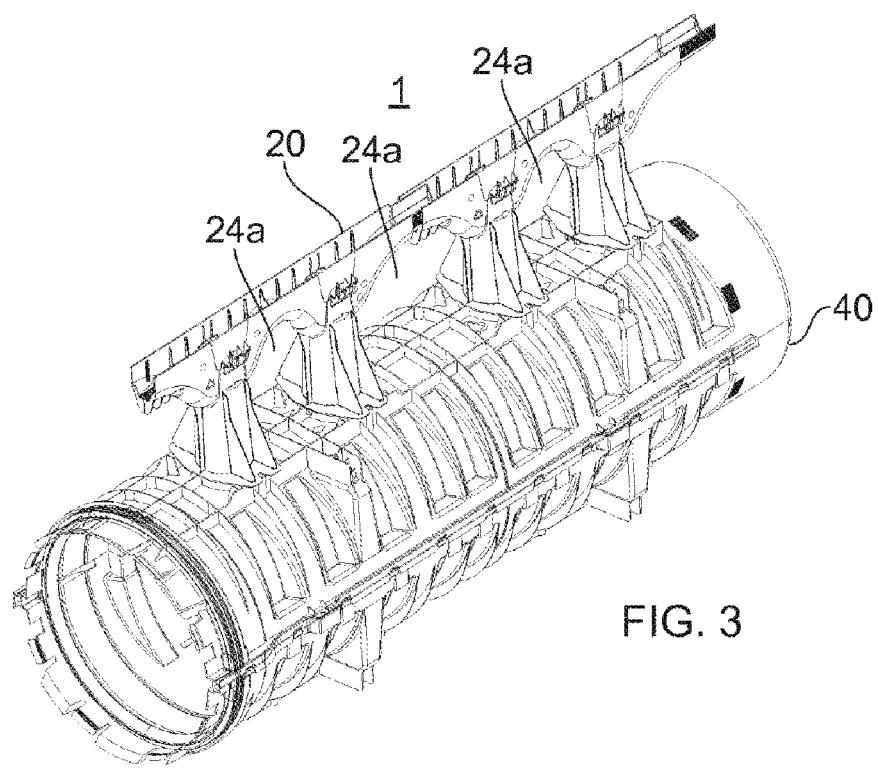
FIG. 3 shows a perspective view of a drainage system 1 according to the embodiment of the invention.

FIG. 3 shows a perspective view of a drainage system 1 according to the embodiment of the invention. The drainage system 1 includes the water receiving unit 20 and the water discharge unit 40. The openings 26 of the neck pieces are connected to the openings 46b of the tubular body 42.

Figure 4:
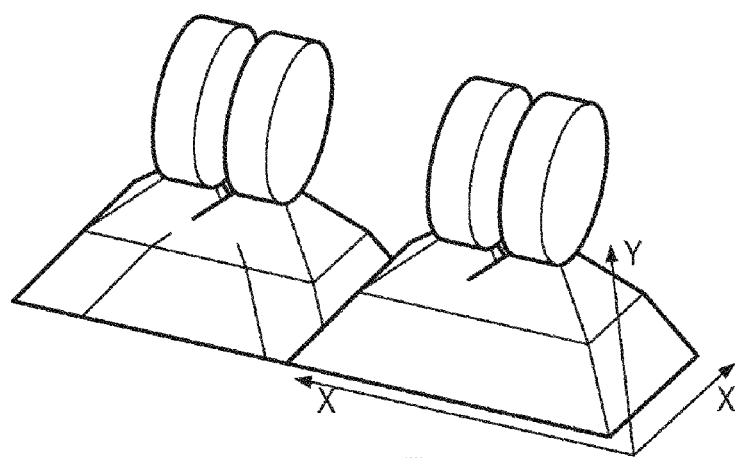
FIG. 4 shows a perspective view of the drainage system 1 according to the embodiment of the invention with load cones.

FIG. 4 shows a perspective view of the drainage system 1 according to the embodiment of the invention with load cones. Here, an axle of a vehicle, for example a truck, with twin tires loads a surface to be drained.

Figure 5:
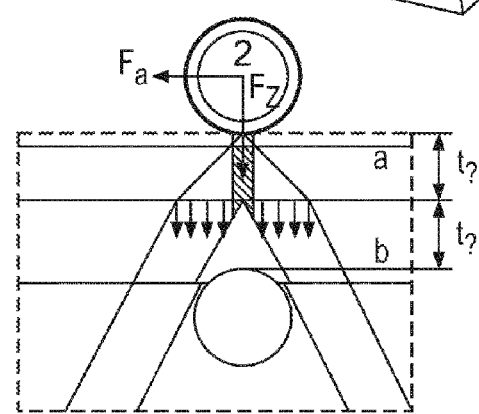
FIG. 5 shows a sectional view of the drainage system 1 according to the embodiment of the invention with a load cone.

FIG. 5 shows a sectional view of the drainage system 1 according to the embodiment of the invention with a load cone (load takedown cone). Above a naturally grown soil (lower stratum, soil stratum) there is a non-grown soil (middle stratum, intermediate stratum), and on the non-grown soil there is a bound stratum (upper stratum, surface stratum) or surface, for example, a traffic surface comprising asphalt or concrete. When a load is applied to the surface, a load cone with a dome is formed. Due to the load cone, the load in the grown soil is distributed over a larger contact area, such that a surface load decreases.

Figure 6:
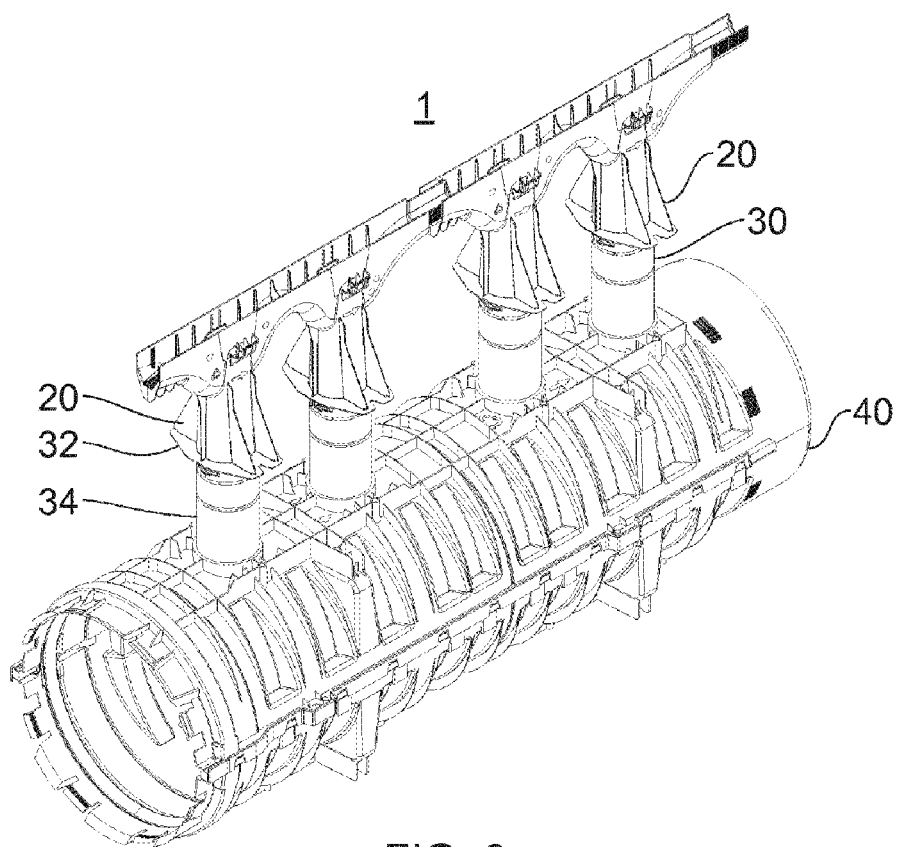
FIG. 6 shows a perspective view of another drainage system 1 according to the embodiment of the invention.

FIG. 6 shows a perspective view of another drainage system 1 according to the embodiment of the invention. The drainage system 1 further comprises a water feeding unit 30 comprising first openings 34 and second openings 34. As shown in FIG. 6, the water feeding unit 30 may be located between the water receiving unit 20 and the water discharge unit 40.

Figure 7:
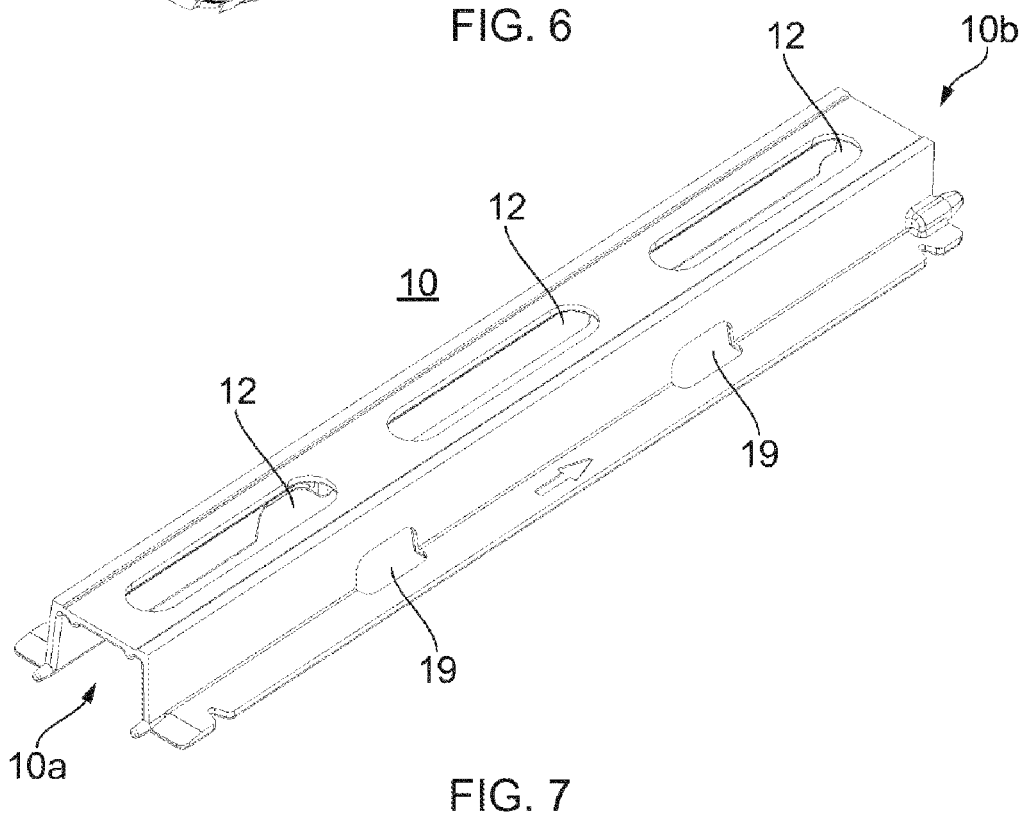
FIG. 7 shows a perspective view of a cover unit 10 according to the embodiment of the invention.

FIG. 7 shows a perspective view of a cover unit 10 according to the embodiment of the invention. The cover unit 10 includes a first end 10a and a second end 10b and openings 12. The cover unit 10 may comprise metal, for example iron or cast iron, plastic, stone, or concrete. In this context, the cover unit 10 can for example be manufactured using a casting process, injection molding process, or 3D printing process. As shown in FIG. 7, the cover unit 10 may include latching regions 19 for latching the latching elements 29 of the water receiving unit 20. The latching regions 19 may be located in openings. Alternatively, or in addition, the cover unit 10 may include latching elements for latching with the latching regions of the water receiving unit 20. The cover unit 10 may include ribs 14. The ribs 14 can serve as a projected edge and/or abutment for the water receptacle 22.

Figure 8:
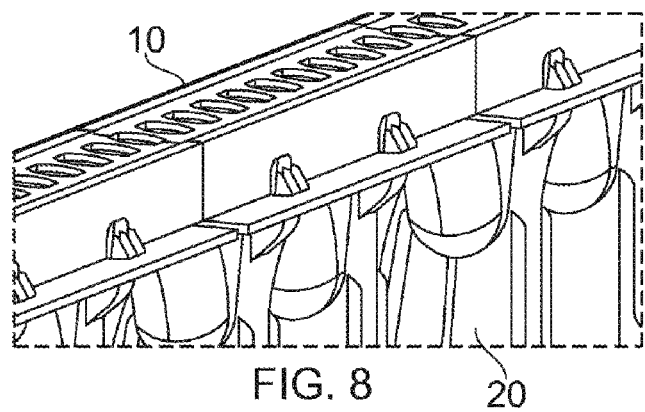
FIG. 8 shows an enlarged perspective view of the water receiving unit 20 and the cover unit 10 according to the embodiment of the invention.

FIG. 8 shows an enlarged perspective view of the water receiving unit 20 and the cover unit 10 according to the embodiment of the invention. The cover unit 10 is arranged on the water receiving unit 20, and the latching elements 29 of the water receiving unit 20 are latched to the latching regions 19 of the cover unit 10.

Figure 9:
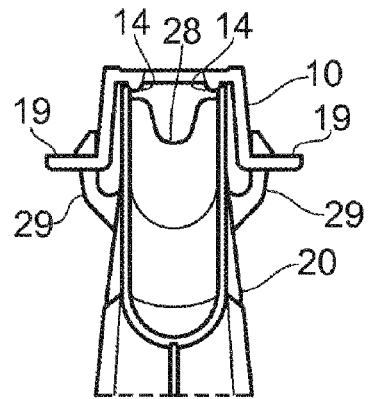
FIG. 9 shows a sectional view of the water receiving unit 20 and the cover unit 10 according to the embodiment of the invention.
Figure 10:
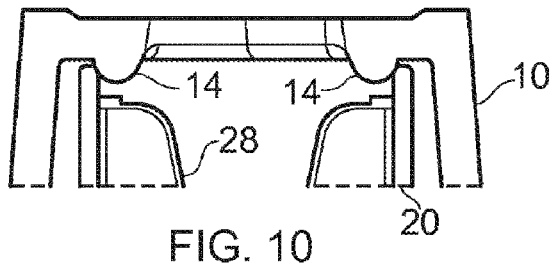
FIG. 10 shows an enlarged sectional view of the water receiving unit 20 and the cover unit 10 according to the embodiment of the invention.

FIG. 9 shows a sectional view and FIG. 10 shows an enlarged sectional view of the water receiving unit 20 and the cover unit 10 according to the embodiment of the invention. The latching elements 29 of the water receiving unit 20 engage through the openings in the cover unit 10 and are latched to the latching areas 19 of the cover unit 10. The transverse rib 28 of the water receiving unit 20 stiffens the water receptacle 22, and the water receptacle 22 engages behind the ribs 14 of the cover unit 10.

Figure 11:
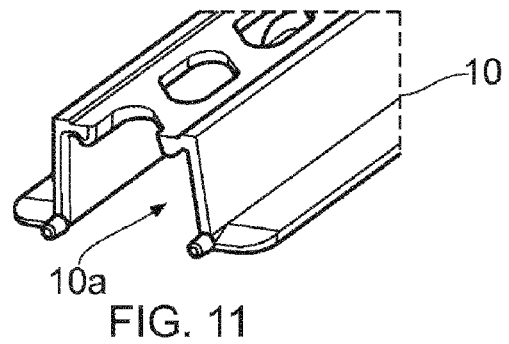
FIG. 11 shows a perspective view of the first end 10*a* of the cover unit 10 according to the embodiment of the invention.

FIG. 11 shows a perspective view of the first end 10a of the cover unit 10 according to the embodiment of the invention. The first end 10a comprises guide pins. The guide pins are arranged laterally.

Figure 12:
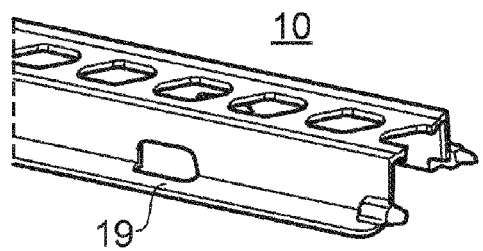
FIG. 12 shows an enlarged perspective view of the first end 10*a* of the cover unit 10 according to another embodiment of the invention.

FIG. 12 shows a perspective view of the first end 10a of the cover unit 10 according to another embodiment of the invention. The guide pins are arranged laterally and reinforced.

Figure 13:
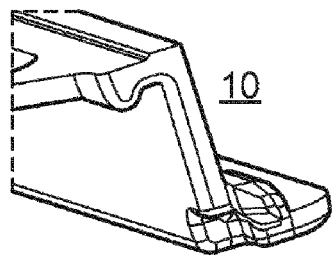
FIG. 13 shows an enlarged perspective view of the second end 10*b* of the cover unit 10 according to the embodiment of the invention.

FIG. 13 shows a perspective view of the second end 10b of the cover unit 10 according to the embodiment of the invention. The second end 10b includes recesses. The recesses are arranged laterally and can interact with the guide pins.

Figure 14:
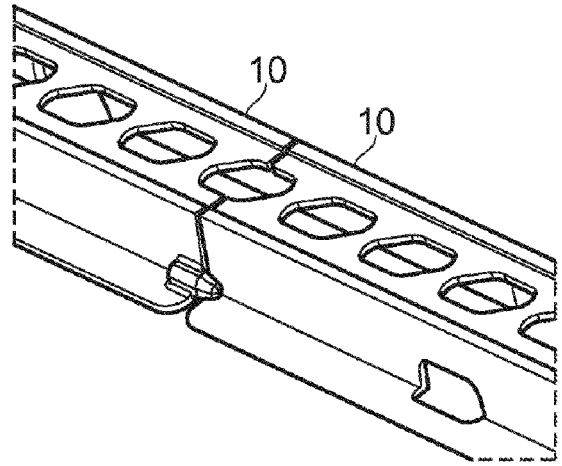
FIG. 14 shows a perspective view of the cover unit 10 and another cover unit according to the embodiment of the invention.
Figure 15:
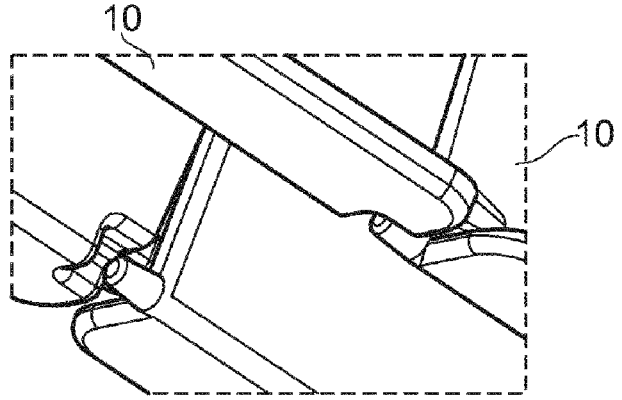
FIG. 15 shows an enlarged perspective view of the cover unit 10 and another cover unit according to the embodiment of the invention.

FIG. 14 shows a perspective view and FIG. 15 shows an enlarged perspective view of the cover unit 10 and another cover unit according to the embodiment of the invention. The guide pins at the first end 10b of the cover unit 10 engage the corresponding recesses at the second end 10b of the other cover unit 10.

FIG. 16 shows a perspective view of a drainage system 1, comprising another water receiving unit 20 and another water discharge unit 40 according to the embodiment of the invention. The water receiving unit 20 already shown in FIG. 3 is connected to the other water receiving unit 20, and the water draining unit 40 already shown in FIG. 3 is connected to the other water draining unit 40.

FIG. 17 shows a perspective view of another drainage system 1, comprising other water discharge units 40a and water passage units 50 according to the embodiment of the invention. The other water discharge units 40a are substantially the same as the water discharge unit 40 described with reference to FIG. 2. The other water discharge unit 40a comprises a tubular body 42 comprising a first end-side opening and a second end-side opening and openings 46b, 46b'. The tubular body 42' may comprise two half-shell bodies 42b', each having openings 46b, 46b'. The first end-side opening may comprise a circumferential seal. The other water discharge units 40a and the water passage units 50 can be arranged between the water receiving units 20 or, as shown in FIG. 16, between the water feeding units 30 and the water discharge units 40.

Alternatively, the water discharge unit 40, which is located at the bottom, may comprise a tubular body 42 comprising two half-shell bodies 42a without the openings 46b. Thus, water drainage can be implemented without a connection to the other water discharge unit 40a, which is located above.

FIG. 18 shows an enlarged perspective sectional view of the water discharge unit 40 according to the embodiment of the invention. The tubular body 42 comprises two half-shell bodies 42a. The shape of the two half-shell bodies 42a is substantially identical. The first end-side opening 44a includes the latching elements and the circumferential seal 48a. Thus, the first end-side opening 44a can be used as a socket end.

FIGS. 19 and 20 show enlarged perspective views of the first end-side opening 44a according to the embodiment of the invention. The first half-shell body 42a includes a first half-shell seal 48b, and the half-shell body 42a includes a second half-shell seal 48c.

FIG. 21 shows a perspective view of the first half-shell body 42a according to the embodiment of the invention. The second end-side opening 44b comprises rib-like insertion guides. The insertion guides may have ribs in areas that are oriented vertically in an installed state, such that areas that are oriented horizontally in an installed state have smooth surfaces. Thus, the second end-side opening 44a can be used as a tip end.

FIG. 22 shows an enlarged perspective view of the second end-side opening 44b of a half-shell body 42a, 42b according to the embodiment of the invention. The ribs of the first half-shell body 42a may be finger-like and may extend beyond an edge region of the first half-shell body 42a. The ribs may become thicker along their extension. The ribs may include beads and/or grooves. The ribs and/or beads may be arranged obliquely.

FIG. 23 shows an enlarged perspective view of the second end-side opening 44b of a half-shell body 42a, 42b according to another embodiment of the invention. The ribs have a constant thickness in this case. The ribs and/or bulges are arranged vertically.

FIG. 24 shows a perspective view of a plurality of half-shell bodies according to the embodiment of the invention. The plurality of half-shell bodies may include first half-shell bodies 42a. Alternatively, or additionally, the plurality of half-shell bodies may include second half-shell bodies 42b. The half-shell bodies can be stacked inside each other and/or on top of each other to save space. In this case, the half-shell bodies 42a, 42b can be stacked vertically one inside the other without lateral offset, as shown in FIG. 24. For storage and/or transportation, the plurality of half-shell bodies may be arranged on a carrier 100, for example a pallet. For example, the plurality of half-shell bodies may be attached to the support 100 by straps.

FIG. 25 shows a perspective view of another plurality of half-shell bodies according to the embodiment of the invention. The plurality of half-shell bodies may include second half-shell bodies 42b having openings 46b. Additionally, the plurality of half-shell bodies may include first half-shell bodies 42a. The half-shell bodies can be stacked inside each other and/or on top of each other to save space. For storage and/or transportation, the further plurality of half-shell bodies may be arranged on a carrier 100, for example a pallet. For example, the plurality of half-shell bodies may pass through rods or tubes attached to the support 100.

FIG. 26 shows an enlarged perspective top view of the second half-shell body 42b according to the embodiment of the invention. The second half-shell body 42b includes the second end-side opening 44b and the opening 46b disposed on the second half-shell body 42b.

Referring to FIG. 23, FIG. 27 shows an enlarged perspective view of the second end-side opening 44b of a tubular body 42, 42' according to the other embodiment of the invention. The tubular body 42, 42' comprises two half-shell bodies 42a, 42b, 42b' joined together to form the tubular body 42, 42'. The two half-shell bodies 42a, 42b, 42b' may be interlocked with each other. The ribs of the two half-shell bodies 42a, 42b, 42b' are latched with each other, such that the two half-shell bodies 42a, 42b, 42b' can stably form the tubular body 42, 42'.

FIG. 28 shows a perspective view of a supporting unit 60 according to the embodiment of the invention. The supporting unit 60 comprises an area 64 for receiving the water discharge unit 40, i.e., the tubular body 42, 42'. The supporting unit 60 may include another area 62 for receiving the water receiving unit 20, i.e., the water receptacle 22.

FIG. 29 shows a perspective view of a plurality of supporting units 60 according to the embodiment of the invention. The supporting units 60 can be stacked to save space. For storage and/or transportation, the plurality of supporting units 60 may be arranged on a carrier 100, for example a pallet. The plurality of supporting units 60 may be secured to the support 100 by straps, for example, or may pass through rods or tubes secured to the support 100.

FIG. 35 shows a perspective view of a supporting unit 60 according to another embodiment of the invention in a first, unseparated state. The supporting unit 60 includes a first bearing member 66a and a second bearing member 66b for receiving the water drainage assembly 40. As shown in FIG. 35, the first bearing element 66a may be a first side element and the second bearing element 66b may be a second side element. The first bearing element 66a and the second bearing element 66b may be mirror images of each other, as shown in FIG. 35. The first bearing element 66a and the second bearing element 66b may also be identical or complementary to each other. The first bearing element 66a and the second bearing element 66b may comprise connecting means and/or latching means, such that they may be connected and/or latched together. The connecting means and/or latching means of the first bearing element 66a and the second bearing element 66b may be configured as a first connecting element 68a and a second connecting element 68b. The supporting unit 60, i.e., the first bearing member 66a, the second bearing member 66b, the first connecting member 68a, and the second connecting member 68b, may be integrally formed, for example, by an injection molding process or plastic injection molding process. In this respect, the first connecting element 68a can be arranged and manufactured within the first bearing element 66a and the second connecting element 68b can be arranged and manufactured within the second bearing element 66b to save space.

FIG. 36 shows a perspective view of the supporting unit 60 according to the other embodiment of the invention in a second, separated state. If necessary, e.g. to facilitate installation of the water discharge unit 40 into the supporting unit 60, the first bearing element 66a and the second bearing element 66b may initially be separated from each other. Further, the first connection element 68a can be separated from the first bearing element 66a and the second connection element 68b can be separated from the second bearing element 66b.

FIG. 37 shows a perspective view of the supporting unit 60 according to the other embodiment of the invention in a third, prepared state. The first connecting element 68a can be "releasably" or "non-releasably" connected to a first receiving area of the first bearing element 66a, as shown in FIG. 37, for example by insertion, sliding, gluing and/or snapping. Accordingly, the second connecting member 68b may be "releasably" or "non-releasably" connected to a second receiving area of the second bearing member 66b. In this context, a "releasable" connection is understood to be a connection that can be released without damage and/or destruction, and an "non-releasable" connection is understood to be a connection that cannot be released without damage and/or destruction.

For renewed, or first-time, connection of the bearing elements 66a, 66b, the first connection element 68a can now be connected or latched to a respective connection area and/or latching area of the second bearing element 66b, the second connection element 68b can be connected or latched accordingly to a respective connection area and/or latching area of the first bearing element 66a.

FIG. 38 shows a perspective view of the supporting unit 60 according to the other embodiment of the invention in a fourth, connected state. Now the side elements 66a, 66b can enclose the water discharge unit 40 (not shown).

FIG. 30 shows a perspective view of a drainage system 1 comprising water receiving units 20, water discharge units 40 and supporting units 60 according to the embodiment of the invention. The supporting units 60 support the water receiving units 20 and water discharge units 40. The drainage system 1 may further comprise alignment units 70. The alignment units 70 are described below with reference to FIGS. 31-33. The supporting units 60 may also support the alignment units 70.

FIG. 31 shows a front view of a drainage system 1, further comprising alignment units 70 according to the embodiment of the invention. The alignment units 70 extend, as strain aids, along the water receiving units 70. They can be used during an assembly or installation of the drainage system 1 for aligning and/or fixing the drainage system 1 and particularly the water receiving units 70.

FIG. 32 shows an enlarged perspective view of the drainage system 1, further comprising the alignment units 70 according to the embodiment of the invention. The alignment units 70 can be designed, for example, as L-profiles, S-profiles, or Z-profiles. The alignment units 70 may include openings 72, such that a mass of the alignment units 70 may be reduced and/or a distribution of surrounding material such as sand, gravel, concrete, or bitumen may be facilitated. The alignment units 70 may include latching elements 74, such that connection to the water receiving units 20 and/or water discharge units 40 can be facilitated. The alignment unit 70 may be adapted to the supporting unit 60.

FIG. 33 shows an enlarged perspective view of an alignment unit 70 according to the embodiment of the invention. The alignment unit 70 may be aligned with the water receiving unit 20 and/or cover unit 10. To this end, the alignment unit 70 can include, for example, openings or recesses that provide space for the latching areas 19 of the cover unit 10 and the latching elements 29 of the water receiving unit 20 and/or the guide pins and recesses of the cover unit 10.

FIG. 34 shows a perspective view of a drainage system 1, further comprising a cast body unit 80 according to another embodiment of the invention. The cast body assembly 80 may comprise concrete and the elements of the drainage system 1. The concrete, from one side or both sides of the water receiving unit 20, can be deposited into the neck piece spaces 24a to enclose each of the neck pieces 24. Alternatively, or in addition, the concrete may, for example, be stored in openings in the supporting unit 60 and/or the alignment unit 70. This allows the drainage system to be prefabricated in sections, reducing on-site labor and/or time.

EXAMPLE 1

The drainage system comprises one or more single-piece or multi-piece upper members 20, such as shown in FIG. 1, and a two-piece or multi-piece lower member 40, such as shown in FIG. 2, which together form a drainage channel element 1, such as shown in FIG. 3. The drainage channel element 1 can also have an inlet frame or grate 10, as shown in FIG. 7, to receive the water and ensure that the channel can be walked on and driven over. The components of the drainage channel element 1 have various technical features and resulting advantages.

Single-piece or multi-piece upper part (without additional pipe section)

In this variant of the upper part 20, individual neck pieces 24 are inserted into the corresponding receptacles 46b of the lower part 40. The neck pieces 24 can be removably secured in/to the receptacles 46b of the lower portion 40. This can be achieved via a clip-on connection and/or screwed connection. Dividing the drainage channel element 1 into upper part 20 and lower part 40 has the advantage that it can be disassembled and stacked for transport and storage and, if necessary, to save space at the construction site, thus reducing the space required in the aforementioned areas. Another advantage is that a more manageable component is available for assembly, e.g. height alignment, on the construction site due to the strength and latchability of the upper part 20. Another advantage is easier sealability, since there is only one sealing plane which must be sealed for the upper part 20 and the lower part 40. In the case of a vertically split upper part, for example, two sealing planes perpendicular to each other would have to be taken into account, wherein particularly the transition area between two sealing planes (horizontal and vertical in this case) would be extremely difficult to seal.

The uppermost part of the upper part 20 is formed by a longitudinally extending channel 22. Within the channel 22, transverse ribs 28 are provided at the apex of the arches to stiffen the channel 22, but also to prevent water from standing in the area of the arch. This could happen if the ribs 28 are not arranged at the apex of the arch. The ribs 28 also have a recess in their upper region which prevents the water from flowing from one rib 28 to the other in the case of neck pieces 24 or inlet cross sections which may be blocked by dirt, for example.

In the lower area of the neck pieces 24, these have a circumferential rim area, as a height stop and abutment for the clip-on connection and/or screwed connection. The diameter of the neck pieces 24 is configured to match the available standard diameters of the pipes, e.g. according to DN 75, 100, such that the neck pieces can be combined with standard pipes and/or standard pipe seals. The receptacles 46b may have a circumferential bevel to facilitate insertion of the individual neck pieces 24 of an upper part 20 into them. Stiffening ribs can be provided in the lower area of the neck pieces 24 to increase lateral rigidity.

The grate 10 is placed onto the channel 22 arranged above the neck pieces 24. The grate may be made of cast iron and/or have at least one recess 19 on its side surfaces corresponding to respective latching projections 29 of the upper part 20. Thus, the grate 10 is releasably attached to the upper part 20. The latching projections 29 also center the grate 10 in all three axes. This particular configuration of the latching projections 29 has the advantage that different grates 10 can be placed onto the upper part 20. In this case, the grate sides may not engage the latching projections 29, but may extend into the clearance of the latching projections 29 and rest on the upper edge of the upper part 20.

Position securing means are provided at the respective end faces of the grate 10 or the frame. One end face of the grate is provided with startup bevels and longitudinally extending positioning pins which interact with positioning pockets provided on the opposite end face. The positioning pockets have a pin section at their ends facing away from the end face. The startup bevel of the opposite end face interacts with the pin sections when two grates 10 are joined. As a result, positioning in two axes is achieved, as shown in FIG. 8 et seq. At least one projected rib 14 extending in the longitudinal direction of the grate 10 is provided on the bottom side of the grate 10 to direct incoming water into the channel 22 and prevent the water from running horizontally past the bottom side of the grate 10 and past the channel 22 due to its surface tension. Advantageously, the outer width of the projected ribs 14 is greater than the width of the channel 22, such that, when the grate 10 is placed, the bottom side projected ribs 14 move the outer channel edges apart, providing a bias between the projected rib 14 and the outer channel edge. Furthermore, the upper edges of the channel are supported on the projected ribs of the grate against a pressure arising during concreting.

The side walls of the grate 10 have draft angles at their ends which allow the visible surfaces of the grate 10 to abut without gaps.

The upper parts 20 each have different end faces 22a, 22b that interact with each other during connection. One end face 22a has a pin portion that has latching means on its side and/or bottom that engage complementary latching means on the other end face 22b and compensate for tolerances, such as manufacturing tolerances and temperature-induced length changes of different materials, in the longitudinal direction. The lateral latching means ensure centering in the transverse direction. Overall, the latching means are configured in such a way that the two upper parts can be moved with a certain increased force, even if the latching means are "latched." For the final fixation of the two upper parts 20 to each other, a screw can be inserted into a respective recess on the bottom of the pin side in the upper part of the other side (pocket end). The latch can then no longer be released due to the contact pressure of the screw. A plurality of downward parallel ribs is on the bottom side of the end of the pocket. These ribs are to prevent workers who have connected two drainage channels by screwing from injuring themselves on the screw that protrudes downward. At the end of the pin piece, there is also a cross rib that can be overflowed, which also causes stiffening for the side walls of the channel 22. A gap-free connection between the grids 10 can be ensured by adjusting the length with the latching means. Thus, it is also possible to create a longer gutter line without gaps between the top edges of the grates 10, since each drainage element 1 offers the possibility of compensating for length tolerances.

The spacing of the arches of the upper part 20 is different. In this case, the spacing corresponds to a distance of 100 mm or an integer multiple thereof, such that steel reinforcement mats commonly used worldwide can be inserted in the gaps. Due to the multi-part nature of the drainage channel element 1 with separate upper part 20, the reinforcement mats can advantageously be inserted from above.

Upper Part with Additional Pipe Piece

Advantageously, pipe sections 30 of standard pipes, e.g. according to DN 75, 100, can be inserted between the upper part 20 and lower part 40. The pipe length can be cut on site as required. It is therefore possible to combine the drainage channel element 1 with standard pipes.

The standard pipes already have a seal that can also be used to seal between the neck pieces 24 and the pipe sections 30. The diameter of the neck pieces 24 is matched to the seals of the pipes in such a way that when the neck pieces 24 are pushed in, a fixation is achieved in addition to the sealing. Additional fixing means are not necessary. On the construction site, it is advantageous to install such drainage channel elements as deep as possible in the soil, such that the vertical loads (vertical pressure, compressive stress) are reduced by the conical spread with increasing depth, since the area over which the load is distributed increases with increasing depth, as shown in FIGS. 4 and 5. Therefore, in this case, it is advantageous to use individual pipe sections 30 that can be cut to length. With pipe sections 30 of different lengths, slope situations can be represented easily and yet fixed in height, and individual overall heights can be achieved. Furthermore, the amount of concrete required for load transfer can be significantly reduced by a particularly deep installation and the resulting low vertical loads.

Two-Piece Lower Part

The two parts 42a, 42b of the lower part 40 are substantially identical, except that the upper part 42b may include openings and/or receptacles for the neck pieces 24 and seals, if any. Advantageously, the individual parts 42a, 42 of the lower part 40 are stackable for transport and storage, as shown in FIGS. 24 and 25.

The connection of two parts (upper piece 42b and lower piece 42a) of the lower part 40 to each other is as follows: a groove extending in the longitudinal direction of the channel is formed on one side wall (right side, see FIG. 20). A sealant 48c, for example a round foam rubber cord, can be inserted into this groove. In the area of the groove base, an elevation is provided which also runs in the longitudinal direction of the channel and applies a linear pressure load on the sealant, particularly when both halves 42a, 42b are joined together, thus ensuring a secure seal. On the opposite side (left side, see FIG. 19), there is a surface which also extends horizontally in the longitudinal direction of the channel and which, analogously to the opposite side (right side), also has an elevation extending in the longitudinal direction of the channel, such that, if the two parts are assembled, a linear pressure load is applied to the sealing means 48b, 48c on both sides, thus ensuring an even more secure seal. It is possible that the surface also has a collar running in the longitudinal direction of the channel to give the sealing geometry additional rigidity, especially against deformation as a result of vertical force application.

In addition to the sealant, the component also has vertically aligned fasteners, for example clips that counteract vertical pulling apart, and domes and pockets that counteract horizontal shifting and twisting. It is further possible to provide the domes and/or pockets with additional latching means to prevent the joint area between the upper piece 42b and the lower piece 42a from deforming and leaking under horizontal load.

Another advantage is that the joint area is identical to the fasteners and can be joined in only one way. As a result, it is easy to connect the upper piece 42b and the lower piece 42b. In addition, two bottom sections 42a (without openings) can be joined together to form a closed pipe cross-section to implement areas where neck sections 24 are not required for drainage. So it is possible to stay in this drainage system without using other pipes. Thus, both continuous slots and interrupted slots are possible in the surface to be drained. It is also possible to use a plurality of point drains above the standard pipes if the longitudinal channel is omitted.

Advantageously, the upper piece 42b and lower piece 42b are substantially identical. One difference is the flange area of the upper piece 42b with the row of openings 46b to the neck pieces 24. This is an advantage because both parts 42b, 42a can be produced with interchangeable inserts from one injection mold. Alternatively, the openings 46b can be made subsequently, even at the construction site. This can reduce production costs.

On both longitudinal flanks, the lower piece 42a and/or upper piece 42b have a plurality of pins as shown in FIG. 21, as well as a plurality of pockets on the other side. Alternatively, pins and pockets can alternate on both sides.

In addition to the connecting means, the upper piece 42b and lower piece 42a have other special features.

The upper pieces and/or lower pieces can be easily stacked as shown in FIGS. 24 and 25. This reduces costs during transport and storage. It is not necessary to stack only upper pieces 42b or only lower pieces 42a. Advantageously, upper pieces and lower pieces can also be stacked one below the other or alternately.

In order to achieve the lowest possible stacking height with geometric rigidity, the upper pieces 42b and lower pieces 42a have inwardly projecting beads only in the side wall area. The beads have two functions: first, the beads provide geometric stiffening for the two pieces 42b, 42a, and second, the beads enable the low stack height by engagement.

In addition, the parts 42b, 42a have outwardly projecting support feet in the side wall area extending into the lower area, which can also be stacked very flat inside each other and/or on top of each other. In this way, a smooth and shock-free (dense) area can be created in the lower section of the lower piece 42a, which is also camera-accessible and easy to clean. A smooth surface results in less buildup and a higher flow rate. The surfaces running horizontally in the longitudinal direction give the component greater longitudinal stiffness when loaded in the longitudinal direction.

To ensure that the bottom of the lower part 42a, or the top of the upper part 42b, is smooth yet stable, the beads are designed as ribs on the outer sides of the lower part 42a, or the upper part 42b. Advantageously, these ribs in this area do not interfere with stacking, since they are adjusted to the stacking height. The minimum stacking height depends on the material thickness and the radius of the semicircular base structure. In the cross-section of the channel body, the ribs are crescent-shaped, running softly into the side wall in the direction of the joint area. This allows the minimum stacking height and provides uniform rigidity over the entire body of the lower part 42a, or upper part 42b. Where the ribs become flatter and/or weaker, the pockets become firmer and stiffer.

To further optimize longitudinal rigidity, the lower piece 42a, and the upper piece 42b in partial sections, have exactly one longitudinal rib centrally on the outer side, which does not hinder concreting of the drainage channel element 1; the concrete can flow from two sides up to the longitudinal rib. This counteracts the formation of unwanted air bubbles in the concrete.

The connection of several drainage channel elements 1 has special features. The upper portion 42b and lower portion 42a each have a socket end 44a and a tip end 44b. The socket end 44a may include at least one latching element. The latching elements are positioned on the periphery of the lower part 42a and upper part 42b, respectively, and engage respective latching surfaces of the tip end 44b. Advantageously, the latching surfaces, analogous to the latching elements of the upper part, can be used to compensate for length tolerances during assembly of the drainage channel elements 1.

Further, the socket end 44a includes at least one insertion aid that allows the tip end 44b to easily slide into the socket end 44a. For this purpose, a startup bevel is formed at the end of an insertion aid.

The tip end 44b has partially circumferential flared insertion aids with a stiffening effect at its end. These insertion aids are not provided on the base or upper part so that the smooth surfaces are not disturbed in terms of flow. The inner surfaces of the tip end 44b have parallel ribs, as shown in FIG. 27, which both increase rigidity in this area and prevent inward slippage of the side walls. The rib ends extend beyond the flanks of the tip end 44b beyond the dividing plane of the component, such that, when the upper part 42b and lower part 42a are joined and the tip end 44b is inserted into the socket end 44a, the contact surfaces of the tip end 44b do not slip against each other. A circumferential seal 48a is insertable into the socket end.

A plurality of connected upper portions 42b and lower portions 42a may be arranged one above the other and interconnected, as shown in FIG. 17, such that the flow of water may be from one portion to the next.

A circumferential, angularly set-off crown area on both end faces of a drainage channel element 1 is also possible. This has the advantage that a barrel ring makes it very easy to connect two drainage channel elements to each other. In addition, due to its width, the barrel ring offers the advantage that temperature-related, material-related, and/or manufacturing-related length tolerances can be compensated by a selectable or adjustable barrel ring width, while the overall system remains tight. In addition, the barrel ring also allows the drainage channel elements 1 to be laid horizontally in radii or curves and, for example in the case of terrain curvatures, vertically, or both at the same time. A sealant or gasket applied to the inside of the barrel ring can ensure a watertight connection between the individual drainage channel elements 1.

Alignment Aids

Foot for Alignment and/or Anchoring

A foot 60 can be arranged at any point on the drainage channel element 1. For this purpose, the foot 60 can be designed in one piece or in several pieces. The foot 60 has an inner contour that corresponds to the outer contour of the channel body 42. The foot 60 may be frictionally or positively connected to the channel element 1. It is also possible for the foot 60 to be formed in one piece or in a material-locking manner with the drainage channel element 1. In this way, the foot 60 can be molded on as well. Anchoring means are arranged in the lower region of the foot 60, which, on the one hand, allow the concrete to flow through and, at least in the region of the contact surfaces, have an enlarged surface for a secure footing and for anchoring.

In addition, as shown in FIG. 29, the enlarged surface in the foot region can be used as a stacking aid.

A plurality of openings is also provided in the upper region of the foot 60 to allow concrete to flow therethrough. In addition, recesses or cylindrical recesses can be provided in the upper area, into which an alignment means and/or support means can be inserted, which enables easier adjustment and fixing of the infeed area, especially in the height-adjustable version.

Straining aids 70 can be arranged on one or both sides in the upper area of the drainage channel element 1, which allow the drainage channel elements 1 to be aligned and fixed to each other in all directions during the installation phase. The straining aids 70 can be cast as well. The straining aid 70 can be manufactured, for example, as a roll-formed profile made of sheet metal. This profile is advantageously less limited in length. The straining aid 70 can be configured as a Z-profile. In this case, a lower leg of the "Z" can rest on the foot 60 and/or the alignment aid and support aid 70 and be fastened there, for example with screws that are screwed through recesses in the straining aid. In this way, the longitudinal alignment (horizontal alignment) can be easily performed.

An upper leg of the Z-section forms the upper stop for the grate 10. If thickness variations occur due to manufacturing tolerances, tabs 74 in the center piece of the Z-section can be bent inward and, due to the inclined position of the center piece in the Z-section, press the leg of the grate 10 upward against the stop of the upper leg of the Z-section. In this way, height alignment (vertical alignment) can be easily performed.

The straining aid also has the function of enabling the gap closure between the individual grates 10. When the straining aid is applied, tabs arranged on the upper leg of the Z-section bend, thus ensuring that the grates 10 rest against each other without a gap in the longitudinal direction.

The straining aid further includes a plurality of recesses 72 to allow concrete to flow therethrough and anchor the Z-section to the structure.

Prefabrication

The drainage system 1 can be assembled at the factory into individual drainage channel elements, which are prefabricated in a casting mold with concrete to form a ready-to-install block. This allows the drainage system 1 to be delivered to the construction site in a pre-concreted condition. This allows time-saving installation of the elements, for example on a taxiway or runway of an airport, on logistics areas, on squares, for example parking lots, or on roads, for example freeways. This can reduce the downtime due to the necessary setting time of the concrete. In this variant, the use of tip ends and barrel rings is dispensed with, as a circumferential seal, for example a sealing compound such as Dichtfix, is applied directly to the joint area. Pretreatment of the sealing surface may be necessary. Advantageously, this variant allows replacement of individual elements, for example after damage.

EXAMPLE 2

Even without independent traffic load bearing structures, a drainage system can be an integral part of an area to be drained.

In this case, the load transfer of the surface is not interrupted by drainage elements, but the drainage elements are selected in such a way that they have only a minor interfering effect in relation to the entire surface, e.g. asphalt surface or concrete surface. The drainage element thus becomes an integral part of the surface.

For this purpose, the drainage element is divided into a substantially vertically extending, only slightly interfering water receiving element 20, an optional water feeding element 30, and a water drainage element 40 extending substantially horizontally, or at a slope, in the ground.

Water Receiving Element

The water receiving element 20 may be, for example, a drainage channel (linear drainage), a simple open channel, or a point drain (point drainage). The water receiving element 20 only has the function of receiving the water. In this case, the water receiving element 20 feeds the received water to the water feeding elements 30 or water discharge elements 40. In the area of the surface, the water receiving element 20 may have a cover, for example a grate 10. The water receiving element 20 should not exceed a specific maximum installation depth. The maximum installation depth is determined in such a way that any weakening of the soil structure is statically only marginally relevant, since it is canceled out by the design-related safety factors, for example the Guidelines for the Standardization of the Pavement of Traffic Areas (RStO). Thus, the water receiving element 20 remains an integral part of the surface. Alternatively, the water receiving elements 20, for example manhole covers with frames, can be integrated into the traffic surface, for example suspended according to the Bituplan principle, such that no loads are passed on to the water discharge elements 30 or water discharge elements 40. Thus, even in this case, the water receiving element 20 remains an integral part of the surface.

Water Feeding Element

In the simplest case, the water feeding element 30 may be formed by at least one hollow tube or the like extending into a water drainage element 40.

It is also possible for the water receiving element 20 and the water feeding element 30 to be integrally formed. To do this, for example, a hollow tube can expand upward to form an elongated water receiving slot at the surface. The spacing of the water feeding elements 30 is determined in such a way that any weakening of the soil structure is statically only marginally relevant, since it is canceled out by the design-based safeties, for example RSTO. The static principle of the bending beam or girder applies. Thus, the water feeding element 30 also remains an integral part of the surface. When designing the system comprising water receiving element 20 and water feeding element 30, care must be taken to ensure that in total the safeties are not completely used up. The water feeding element 30 may be telescopic or telescoping in design and/or comprise multiple parts. The water feeding element 30 may be sealed with respect to the water discharge element 40.

Water Drainage Element

The water drainage element 40 is installed at a depth at which the soil is capable of receiving the occurring load at rest and conducting it around the water drainage element 40. The depth required for this is determined by the load to be transferred and the nature of the surface and the soil using the respective load transfer cones (see FIG. 5). To ensure the load-bearing capacity of the load cone, the contact area on the adjacent soil stratum of the load cone must be sufficiently large. In this case, the load cone must have a sufficient footprint on the adjoining soil stratum, such that the adjoining soil stratum can receive the loads in the static rest condition.

In the area where the soil can transfer the load in the static rest condition according to a load transfer angle, a dome formation begins to occur above the cavity where the water drainage element 40 is located. The dome thus protects the water drainage element 40 from the load inputs at the surface. In the area below the dome, it is advantageous to use a water drainage element 40 that only needs to have a low static load-bearing capacity, for example a simple pipe with a small wall thickness. The water feeding elements 30 may extend into the water discharge element 40 while remaining movable in the vertical direction. The water drainage element 40 may have a gradient, if necessary. For this purpose, the water feeding elements 30 can be freely displaced in the water discharge element 40, preferably in the vertical direction. This can further simplify the installation of the system. Settlements, for example due to ground movement and/or changes due to frost and no frost, thus have no effect on the drainage system or on the surface. Since the water receiving element 20 is an integral part of the surface, it cannot grow out of the surface. The cause of growing out is that the drainage element maintains its position and the surrounding soil or pavement is recompacted. Even asphalt surfaces can recompact themselves by up to 2%.

(The following overview shows exemplary distances or installation depths, from the surface to a top edge of the water drainage element 40, of the water drainage element 40 depending on the diameter of the water drainage element 40 according to RStO Asphalt and RStO Concrete. This results in the minimum (min.) distances for RStO Concrete, load class 100 (BK 100) and the maximum (max.) distances for RStO Asphalt, load class 0.3 (BK0.3).

| Outer diameter mm | Nominal diameter/ mm | min. distance (depth)/m (from RStO Concrete) | max. distance (depth)/m (from RStO Asphalt) | average distance (average depth)/m |
|---|---|---|---|---|
| 200 | DN 200 | 0.43 | 0.63 | 0.51 |
| 225 | DN 200 | 0.45 | 0.65 | 0.53 |
| 250 | DN 250 | 0.47 | 0.68 | 0.56 |
| 280 | DN 250 | 0.50 | 0.70 | 0.58 |
| 315 | DN 300 | 0.53 | 0.73 | 0.61 |
| 355 | DN 350 | 0.56 | 0.77 | 0.65 |
| 400 | DN 400 | 0.60 | 0.81 | 0.69 |
| 450 | DN 450 | 0.64 | 0.85 | 0.73 |
| 500 | DN 500 | 0.69 | 0.89 | 0.77 |
| 560 | DN 600 | 0.74 | 0.94 | 0.82 |
| 630 | DN 600 | 0.80 | 1.00 | 0.88 |
| 710 | DN 700 | 0.87 | 1.07 | 0.95 |
| 800 | DN 800 | 0.95 | 1.15 | 1.03 |
| 900 | DN 900 | 1.03 | 1.24 | 1.12 |
| 1000 | DN 1000 | 1.12 | 1.32 | 1.21 |

This results in a direct combination of the technical properties of the drainage element with the soil conditions actually prevailing on site. This makes it possible to eliminate additional supporting structures for load transfer, for example concrete foundations, which are arranged at least below the drainage elements to ensure adequate load distribution and prevent the drainage elements from suffering damage, for example cracks or breakage, or leaving their installation position in the event of a load.

This results in reduced material usage for the drainage element. In addition, the construction effort, for example, the amount of concrete used on site, is reduced, and the setting time on site is shortened. Saving concrete and its transport improves the $CO_2$ balance. There are no settlement phenomena due to post-compaction in the various layers, for example pavement layers and soil layers such as non-grown soil.

Rework, such as application of a new asphalt layer, can be eliminated. Elimination of raised drainage elements can improve drainage. This can reduce a risk of aquaplaning. Furthermore, during snowfall, for example, the risk of the drainage elements being damaged by snow blades of snow plows and then having to be replaced can be reduced. In addition, the side walls of the drainage elements are subjected to less static/dynamic load, such that the risk of breakage of the side walls can be reduced.

The features of the examples can be freely combined with each other.

| List of reference numerals | |
|---|---|
| 1 | drainage system |
| 10 | cover unit |
| 10a | first end |
| 10b | second end |
| 12 | opening |
| 14 | rib |
| 19 | latching area |
| 20 | water receiving unit |
| 22 | water receptacle |
| 22a | first end |
| 22b | first end |
| 24 | neck piece |
| 24a | neck piece space |
| 26 | opening of the neck |
| 28 | cross rib |
| 29 | latching element |
| 30 | water feeding unit |
| 32 | first opening |
| 34 | second opening |
| 40 | water discharge unit |
| 40a | other water discharge unit |
| 42, 42' | tubular body |
| 42a | half shell body without opening |
| 42b' | half shell body with opening |
| 42b | half shell body with opening |
| 44a | first end-side opening |
| 44b | second end-side opening |
| 46b | opening |
| 46b' | other opening |
| 48a | circumferential seal |
| 48b | first half-shell seal |
| 48c | second half-shell seal |
| 49a | channel element |
| 49b | cover element |
| 50 | water passage unit |
| 60 | supporting unit |
| 62 | water receiving area |
| 64 | water drainage area |
| 66a | first bearing element |
| 66b | second bearing element |
| 68a | first connecting element |
| 68b | second connecting element |
| 70 | alignment unit |
| 72 | opening |
| 74 | latching element |
| 80 | cast body unit |
| 100 | support |

The invention claimed is:

1. A drainage system comprising:
at least one water receiving unit, comprising:
a water receptacle for receiving water from an adjoining surface of an upper stratum; and
at least one drainage unit, comprising:
  a body; and
  standard pipes of different lengths for insertion between the water receiving unit and the at least one drainage unit;
wherein:
  the water receptacle is integrated into the upper stratum;
  the drainage unit is provided and oriented in a middle stratum at a distance under the surface, with respect to its uppermost face, such that water flowing out of the water receiving unit can flow into the drainage unit through a connection between the water receptacle and the body provided by the standard pipes; and
  a length of each of the standard pipes achieves an individual height so that the connection is maintained irrespective of a change of the distance.

2. The drainage system according to claim 1, wherein:
the distance is chosen or dimensioned in such a way that a load on the surface in the upper stratum or the middle stratum is distributed in such a way that its effect on the body is neglected.

3. The drainage system according to claim 1, wherein:
the water receptacle is configured as point drainage system; or
the water receptacle is configured as a linear drainage system; or
the water receptacle and the surface comprise connecting means, such that they are connected together wherein the water receptacle comprises metal, concrete, polymer concrete, or plastic, or a combination thereof.

4. The drainage system according to claim 1, wherein:
the drainage unit is designed as a water discharge unit for draining off the water.

5. The drainage system according to claim 1, wherein:
the distance is selected or dimensioned taking into account an outer diameter of the body, wherein:
the outer diameter is 200 mm to 1000 mm, 250 mm to 900 mm, 315 mm to 800 mm, 400 mm to 630 mm or 500 mm.

6. The drainage system according to claim 1, wherein:
the body is dimensioned taking into account the distance wherein the body comprises metal, concrete, polymer concrete, or plastic, or a combination thereof.

7. A water receiving unit for use in the drainage system according to claim 1.

8. A drainage unit for use in the drainage system according to claim 1.

9. A water discharge unit for use in the drainage system according to claim 1.

10. A water storage unit for use in the drainage system according to claim 1.

11. The water storage unit according to claim 10, wherein the water storage unit is configured as an infiltration ditch or cistern.

12. A drainage method, comprising:
providing at least one water receiving unit comprising:
a water receptacle for receiving water from an adjoining surface of an upper stratum; and
providing at least one drainage unit, comprising:
a body; and
standard pipes of different lengths for insertion between the water receiving unit and the at least one drainage unit;
integrating the water receptacle into the upper stratum; and
arranging and aligning the drainage unit at a distance, relative to its upper side, below the surface at least partially in a middle stratum, such that the water flowing out of the water receiving unit can flow into the drainage unit through a connection of the water receptacle and the body provided by the standard pipes;
wherein:
a length of each of the standard pipes achieves an individual height so that the connection is maintained irrespective of a change of the distance.

13. The drainage method according to claim 12, wherein:
the distance is dimensioned in such a way that a load on the surface in the upper stratum or the middle stratum is distributed in such a way that its effect on the body is neglected.

14. The drainage method according to claim 12, wherein:
the water receptacle is configured as point drainage system; or
the water receptacle is configured as a linear drainage system; or
the water receptacle and the surface comprise connecting means such that they are connected together;
wherein the water receptacle comprises metal, concrete, polymer concrete, or plastic, or a combination thereof.

15. The drainage method according to claim 12, wherein:
the drainage unit is configured as a water discharge unit for discharging the water.

16. The drainage method according to claim 12, wherein:
the distance is dimensioned taking into account a component of the middle stratum or its angle of repose, wherein:
the angle of repose is 25° to 45°
wherein the middle stratum comprises rock, stones, sand, broken sand, round stones, gravel, broken stones, crushed stone, railroad ballast, chippings and/or slags.

17. The drainage method according to claim 12, wherein:
the body is dimensioned taking into account the distance, the body comprises metal, concrete, polymer concrete, or plastic, or a combination thereof.

* * * * *